(12) United States Patent
Arangasamy et al.

(10) Patent No.: US 9,967,372 B2
(45) Date of Patent: *May 8, 2018

(54) MULTI-HOP WAN MACSEC OVER IP

(71) Applicant: Cisco Technology, Inc., San Jose, CA (US)

(72) Inventors: Kuralvanan Arangasamy, San Jose, CA (US); Brian Eliot Weis, San Jose, CA (US); Rakesh Chopra, Menlo Park, CA (US); Hugo J. W. Vliegen, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/077,052

(22) Filed: Mar. 22, 2016

(65) Prior Publication Data

US 2017/0104850 A1   Apr. 13, 2017

Related U.S. Application Data

(60) Provisional application No. 62/240,591, filed on Oct. 13, 2015.

(51) Int. Cl.
*H04L 12/741* (2013.01)
*H04L 29/06* (2006.01)
(Continued)

(52) U.S. Cl.
CPC .............. *H04L 69/22* (2013.01); *H04L 12/28* (2013.01); *H04L 12/4633* (2013.01);
(Continued)

(58) Field of Classification Search
None
See application file for complete search history.

(56) References Cited

U.S. PATENT DOCUMENTS 6,795,917 B1   9/2004   Ylonen
8,370,921 B2   2/2013   Duan et al.
(Continued)

OTHER PUBLICATIONS

Mick Seaman, "MACsec hops", Revision 2.0, Feb. 10, 2013, 16 pages.
(Continued)

*Primary Examiner* — Afsar M Qureshi
(74) *Attorney, Agent, or Firm* — Edell, Shapiro & Finnan, LLC

(57) ABSTRACT

In an egress processing method, an egress frame is received. The egress frame includes an outer Ethernet frame, an Internet Protocol (IP) header, a layer 3 (L3) encapsulation identifying a layer 2 (L2)-over-L3 tunnel protocol, and an inner Ethernet frame with a payload. The outer Ethernet frame, the IP header, and the inner Ethernet frame, and the L3 encapsulation are parsed. Based on results of the parsing, a media access control security (MACsec) policy that defines how to protect the inner Ethernet frame is determined, and the inner Ethernet frame is protected according to the MACsec policy, while leaving unprotected the outer Ethernet frame, the IP header, and the L3 encapsulation, to produce a partly protected output egress frame. The partly protected output egress frame is transmitted to the peer network device over a public wide area network.

23 Claims, 23 Drawing Sheets

(51) Int. Cl.
  *H04L 12/28* (2006.01)
  *H04L 12/46* (2006.01)
(52) U.S. Cl.
  CPC ........ *H04L 63/0428* (2013.01); *H04L 63/162* (2013.01); *H04L 63/164* (2013.01)

(56) References Cited

U.S. PATENT DOCUMENTS

| | | |
|---|---|---|
| 8,966,240 B2 | 2/2015 | Chopra |
| 2004/0143734 A1 | 7/2004 | Buer et al. |
| 2006/0182127 A1 | 8/2006 | Park |
| 2006/0191002 A1 | 8/2006 | Lee et al. |
| 2007/0133528 A1 | 6/2007 | Jin et al. |
| 2007/0147378 A1 | 6/2007 | Elgebaly et al. |
| 2007/0223456 A1 | 9/2007 | Maruyama et al. |
| 2008/0123652 A1 | 5/2008 | Akyol |
| 2008/0126559 A1 | 5/2008 | Elzur et al. |
| 2009/0307751 A1 | 12/2009 | Lin et al. |
| 2010/0153701 A1* | 6/2010 | Shenoy .............. H04L 12/4633 713/151 |
| 2010/0228974 A1* | 9/2010 | Watts ................. H04L 12/4633 713/168 |
| 2010/0229013 A1 | 9/2010 | Diab et al. |
| 2011/0078783 A1 | 3/2011 | Duan et al. |
| 2011/0087878 A1 | 4/2011 | Weis et al. |
| 2011/0119740 A1 | 5/2011 | Grayson et al. |
| 2011/0128975 A1 | 6/2011 | Kang et al. |
| 2011/0261812 A1 | 10/2011 | Kini et al. |
| 2013/0329547 A1* | 12/2013 | Takase ................ H04L 41/0654 370/220 |
| 2014/0119375 A1* | 5/2014 | Tseng ..................... H04L 49/70 370/392 |

OTHER PUBLICATIONS

"IEEE Standard for Local and metropolitan area networks Media Access Control (MAC) Security", Aug. 2006, IEEE, pp. 1-154.

Jun-Won Lee et al., "Design of Secure ARP on MACsec(802.1AE)", Dec. 16-18, 2010, IEEE, pp. 1-4.

Brian Weis, "Security considerations and proposal for MACsec key establishment", May 15, 2006, IEEE, pp. 1-18.

Hayriye Altunbasak et al., "Security Inter-layering for Evolving and Future Network Architectures", Mar. 22-25, 2007, IEEE, pp. 615-620.

International Search Report and Written Opinion in counterpart International Application No. PCT/US2012/049110, dated Nov. 15, 2012, 8 pages.

* cited by examiner

US 9,967,372 B2

MULTI-HOP WAN MACSEC OVER IP

PRIORITY CLAIM

This application claims priority to U.S. Provisional Application No. 62/240,591, filed Oct. 13, 2015, the entirety of which is incorporated herein by reference.

TECHNICAL FIELD

The present disclosure relates to combining MACsec with OSI layer 3 protocols.

BACKGROUND

Media Access Control (MAC) Security (MACSEC or MACsec), defined in the IEEE 802.1AE standard, is a connectionless secure communication protocol that was initially defined for Open Systems Interconnection (OSI) layer 2 (L2) point-to-point security between two devices. Existing MACsec typically encrypts all of the data in an Ethernet frame except for a MAC source address (SA) and a MAC destination address (DA). Therefore, existing MACsec is primarily suited for local area network (LAN)/Ethernet environments. To provide MACsec services over a Wide Area Network (WAN), service providers (SPs) offer layer 2 transparent services such as Ethernet private line (E-Line) or E-LAN using various transport layer protocols, such as Ethernet over Multiprotocol Label Switching (EoMPLS) and Layer 2 Tunneling Protocol Version 3 (L2TPv3). A limitation of MACsec across a WAN is that all information except for the source and destination MAC addresses and the MACsec header are encrypted, which means a service provider can only offer port based services. Therefore, it is not possible to offer multiple E-LINE or E-LAN services on a single port, unless the service provider provides layer 2 Virtual LAN (VLAN) services. Internet Protocol Security (IPsec) may be used to encrypt Internet Protocol (IP) packets; however IPsec-based encryption devices add substantial overhead and cannot keep up with line operating rates.

DESCRIPTION OF EXAMPLE EMBODIMENTS

Overview

Figure 1:
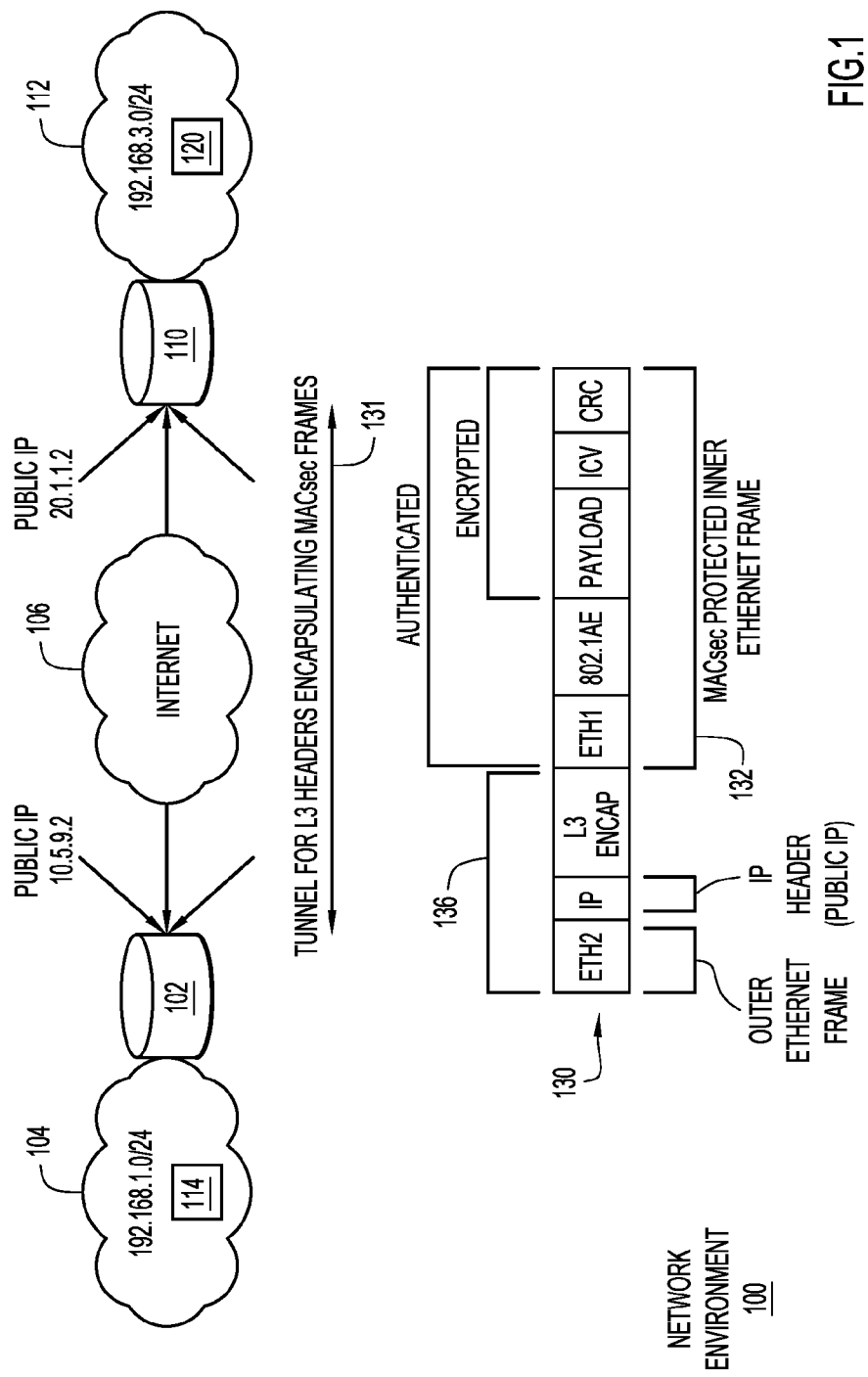
FIG. 1 is a diagram of a network environment that uses multi-hop wide area network WAN MACsec over Internet Protocol (IP), also referred to as "multi-hop WAN MACsec" or "MACsec over L3," according to an embodiment.

An egress frame processing method is performed at a network device. An egress frame is received at the network device. The egress frame includes an outer Ethernet frame, an Internet Protocol (IP) header defining an IP tunnel between the network device and a peer network device over a public wide area network, a layer 3 (L3) encapsulation identifying a layer 2 (L2)-over-L3 tunnel protocol, and an inner Ethernet frame with a payload and that is demarcated by the L3 encapsulation. The outer Ethernet frame, the IP header, the L3 encapsulation, and the inner Ethernet frame are parsed. Based on results of the parsing, a media access control security (MACsec) policy that defines how to protect the inner Ethernet frame is determined. Also, the inner Ethernet frame is protected according to the MACsec policy, while leaving unprotected the outer Ethernet frame, the IP header, and the L3 encapsulation, to produce a partly protected egress frame. The partly protected egress frame is transmitted to the peer network device over the IP tunnel of the public wide area network.

An ingress processing method is performed at a network device. An ingress frame transmitted by a peer network device to the network device over a public wide area network via an Internet Protocol (IP) tunnel is received at the network device. The ingress frame includes an unprotected outer Ethernet frame, an unprotected IP header defining the IP tunnel, an unprotected layer 3 (L3) encapsulation identifying a layer 2 (L2)-over-L3 tunnel protocol, and a MACsec protected inner Ethernet frame carrying a payload destined for a destination device. The unprotected outer Ethernet frame, the unprotected IP header, the unprotected L3 encapsulation, and the MACsec protected inner Ethernet frame are parsed. A media access control security (MACsec) policy that defines the MACsec protection on the MACsec protected inner Ethernet frame in determined based on results of the parsing. The MACsec protection is removed from the MACsec protected inner Ethernet frame according to the MACsec policy, to produce an inner Ethernet frame. The inner Ethernet frame is transmitted to the destination device.

DETAILED DESCRIPTION

Embodiments presented herein provide a way to extend MACsec via any public IP WAN such as the Internet. By encapsulating a MACsec frame with a transport layer protocol such as IP (e.g. EtherIP), Ethernet over Mutiprotocol Label Switching (EoMPLS) over GRE (e.g. Transparent Ethernet Bridging over GRE), and the like, the resulting encapsulated frame or packet can be transported over any public WAN such as the Internet or MPLS WAN circuits to a remote end. After first decapsulation at the remote end, the original MACsec frame can be retrieved as if it were received on a layer 2 direct connected link. Then, after decryption of the MACsec frame at the remote end, the original frame can be retrieved/recovered. Since the original frame is MACsec encrypted, there is no need for another encryption such as IPSec and there is no need for an overlay network.

A difference between embodiments presented herein and existing layer 2 transparent services provided by service providers, such as Ethernet Virtual Circuits (EVC), is that service provider EVC encapsulation is added over a MACsec frame that is already encrypted by customer equipment (CE), and the encrypted frame is transported to a service provider edge (PE) device, which represents a two box solution. The customer equipment handles the EVC encapsulated frame as an L2 Ethernet frame and hence the customer equipment is limited to using the L2 services of the service provider.

In embodiments presented herein, the CE may generate and transmit a transport layer encapsulated frame including an inner Ethernet header (including a tunnel source MAC address and a tunnel destination MAC address) to a network device, and the network device adds MACsec encryption over the received frame, but leaves the transport layer encapsulation header in the clear, e.g. using a header offset. This process allows for encryption of inner Ethernet frame while leaving the transport layer encapsulation in clear which can then be transported via any public network such as the Internet to a remote end without a need for L2 transparent services from a service provider.

In the embodiments, MACsec encrypts the packet including the inner IP header, which eliminates the need for IPsec and, since the original IP addresses are encrypted, the solution also eliminates a need for another overlay network to mask the enterprise private network. Additionally, a Dynamic Multipoint VPN (DMVPN) like solution (e.g., a multi-point GRE overlay without IPsec) on top of the converted MACsec packet would allow multiple sites to be automatically discovered and interconnected without a need for administrative overhead and expensive point-to-point dedicated links.

Overlay technologies to transport Ethernet frames:
  a. Ethernet Over IP (EtherIP)—RFC 3378.
  b. Ethernet over GRE tunneling (Transparent Ethernet Bridging)—RFC 1701.
  c. Layer 2 Tunneling Protocol version 3 (L2TPv3)—RFC 3931.
  d. Ethernet over MPLS (EoMPLS)—RFC 4448.
  e. EoMPLS over GRE—RFC 4023 (MPLS over IP or GRE).
  f. Layer 2 LISP—RFC 6830 (LISP).
  g. Cisco OTV (a.k.a Ethernet Over MPLS over GRE);
  h. IETF OTV (IETF Draft).
  i. VxLAN Ethernet (IETF Draft).
  j. NvGRE-Network Virtualization over GRE (IETF Draft).
  k. Using Ethernet over mGRE Tunneling & IPSec (Transparent Ethernet Bridging) for double encryption.

FIG. 1 is a diagram of a network environment 100 that uses multi-hop WAN MACsec over IP, also referred to herein as "MACsec over IP," "multi-hop WAN MACsec," and "MACsec over L3 protocol" (i.e., MACsec over L3). Multi-hop WAN MACsec encapsulates MACsec frames into a Transport layer protocol (indicated by an L3 encapsulation field) such as IP, GRE, LISP, VxLAN, and the like, for transport over any public WAN such as the Internet. This removes the cost of network encryption (e.g., IPsec) from the data plane. In FIG. 1, network environment 100 includes a first network device 102 connected with a first host network 104 and a communication network 106, and a second network device 110 connected with a second host network 112 and the communication network. First host network 104 and second host network 112 may be enterprise networks, for example, each including many host devices. In the example of FIG. 1, first host network includes a first host device 114 and second host network 112 includes a second host device 120. Host devices 114 and 120 may be any computer device with communication capability, including a mobile communication device. Network devices 102 and 110 may include network routers and/or switches. Communication network 106 may include one or more public WANs and one or more LANs, for example, and is, therefore, also referred to as a "public network."

Data packets may be transmitted in a secure/protected form from first host device 114 to second host device 120 (and vice versa) using multi-hop WAN MACsec in the following manner. Host device 114 transmits to network device 102 an Ethernet frame having a payload carrying an IP packet destined for (i.e., addressed to) host device 120. The IP packet includes an IP header having source and destination IP addresses (e.g., 192.168.1.10 and 192.168.3.10, respectively, not specifically shown in FIG. 1). Network device 102 generates a MACsec over IP frame 130 (also referred to interchangeably as a MACsec over IP packet) based on the received Ethernet frame and transmits the MACsec over IP frame over communication network 106 via an IP tunnel 131 between network device 102 and network device 110 (which acts as a peer to network device 102).

In the example of FIG. 1, MACsec over IP frame 130 includes:
 a. an outer Ethernet header or frame "Eth2," including, e.g., a MAC SA for network device 102, a MAC_DA for a next hop network device for routing of the frame 130 through IP tunnel 131, and an Ethertype field;
 b. an IP header "IP" having IP addresses associated with the IP tunnel (e.g., associated with public IP addresses 10.5.9.2 and 20.1.1.2 of network devices 102 and 110, respectively);
 c. an L3 encapsulation field "L3 ENCAP" to indicate a specific type of L2-over-L3 encapsulation being used to transport frame 130 through IP tunnel 131; and
 d. a MACsec protected inner Ethernet frame 132 (also referred to as a MACsec frame 132) demarcated by L2-over-L3 encapsulation field "L3 ENCAP."

Outer Ethernet frame Eth2, IP header "IP," and L3 encapsulation field "L3 ENCAP" collectively represent an outer encapsulation 136 of inner MACsec frame 132.

MACsec frame 132 includes, from left-to-right in FIG. 1: an Ethernet header Eth1 (e.g., for a "routed" case where network devices 102 and 110 are both acting as routers, a MAC SA and a MAC DA for host device 114 and network device 102, respectively); an IEEE 802.1AE (i.e., MACsec) field, such as a security tag (SecTag); a payload (e.g., the original IP packet from host device 114); an integrity check value (ICV); and a cyclic redundancy check (CRC). In the example of FIG. 1, MACsec frame 132 is fully integrity protected (i.e., authenticated), but only partly encrypted, i.e., only the payload and the ICV are encrypted.

MACsec over IP frame 130 is able to be routed over public communication network 106 because IP header "IP" is in the clear, but frame 130 protects the MACsec encrypted PAYLOAD.

Figure 2:
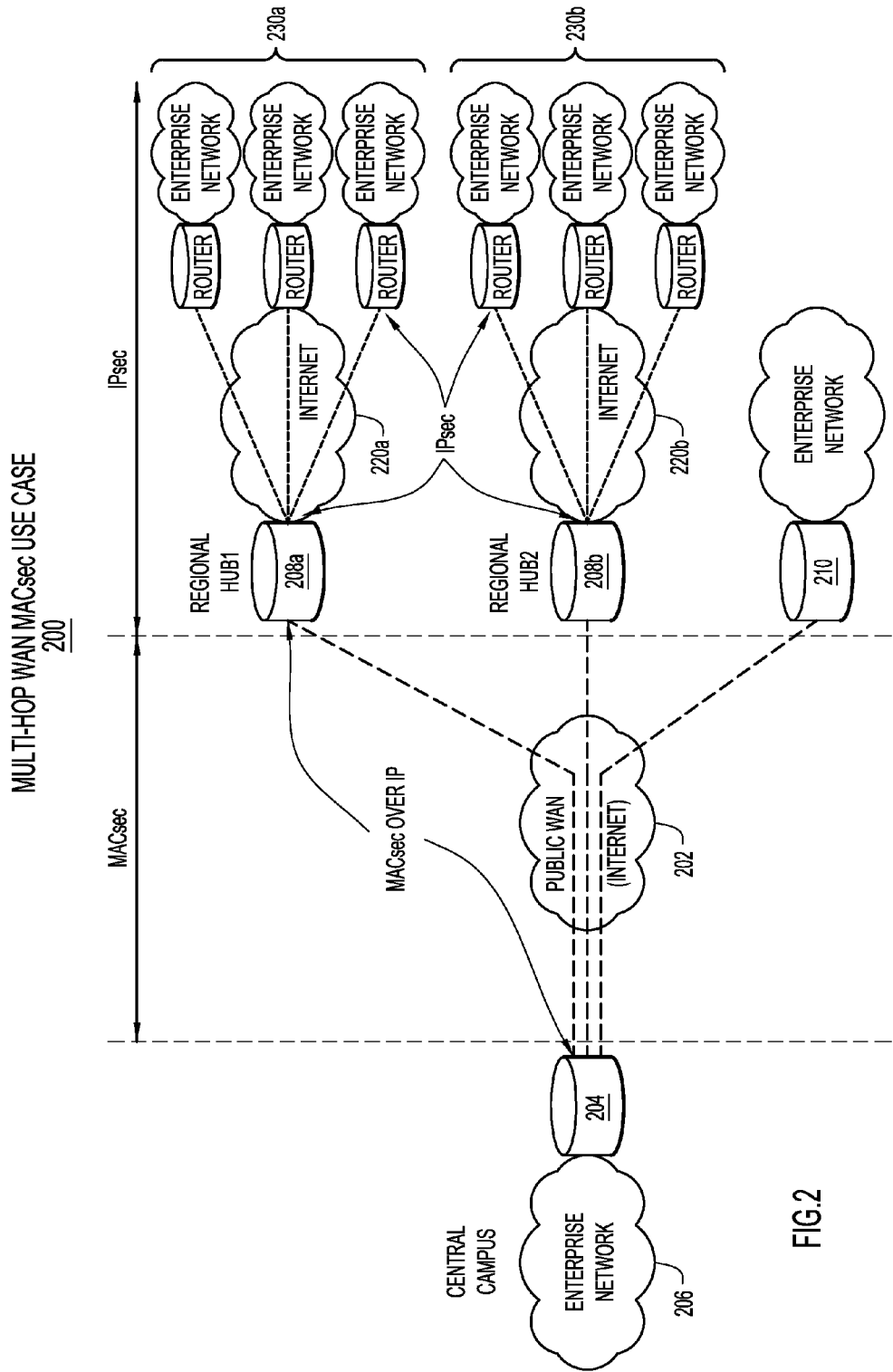
FIG. 2 is a diagram of a use case for multi-hop WAN MACsec (MWM), according to an embodiment.

FIG. 2 is a diagram of a use case for multi-hop WAN MACsec, according to an embodiment. MACsec targets customers in need of high data throughput, with limited resources. IPsec targets customers with plentiful resources, but is limited by aggregate throughput. Because MACsec enables high data throughput at reduced cost, multi-hop WAN MACsec over IP may be advantageously used in aggregate data scenarios, such as in an enterprise network shown in FIG. 2. In FIG. 2, multi-hop WAN MACsec over IP is used to protect traffic flowing over a public WAN 202 between an enterprise network router 204 (connected with an enterprise network 206) and (i) regional hub routers 208, and (ii) another enterprise network router 210. In turn, IPsec is used to protect traffic flowing over respective ones of public WANs 220 between each of regional hub routers 208 and corresponding ones of IPsec sites 230.

Figure 3:
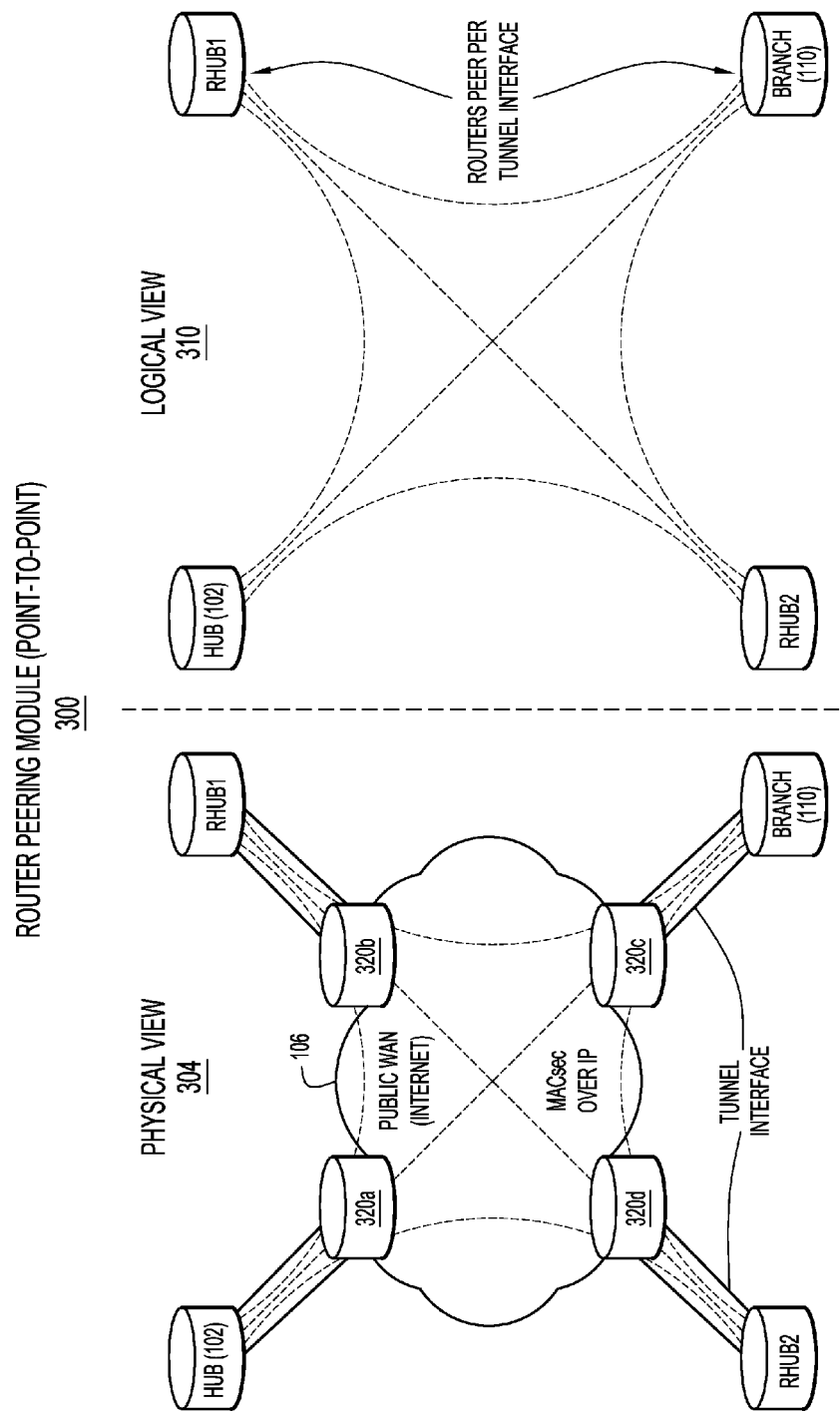
FIG. 3 is a diagram of a router peering model used with multi-hop WAN MACsec that is point-to-point, according to an embodiment.

FIG. 3 is a diagram of a router peering model used with multi-hop WAN MACsec that is point-to-point and that shows a physical view 304 and a corresponding logical view 310 of the peering model, according to an embodiment. In both the physical and logical views 304 and 310, peer routers Hub, Rhub1, Rhub2, and Branch appear as though directly connected with each other over communication network 106 in a peer-to-peer fashion, even though in the physical view, intermediary routers 320 are interposed between the peer routers, as shown.

Figure 4:
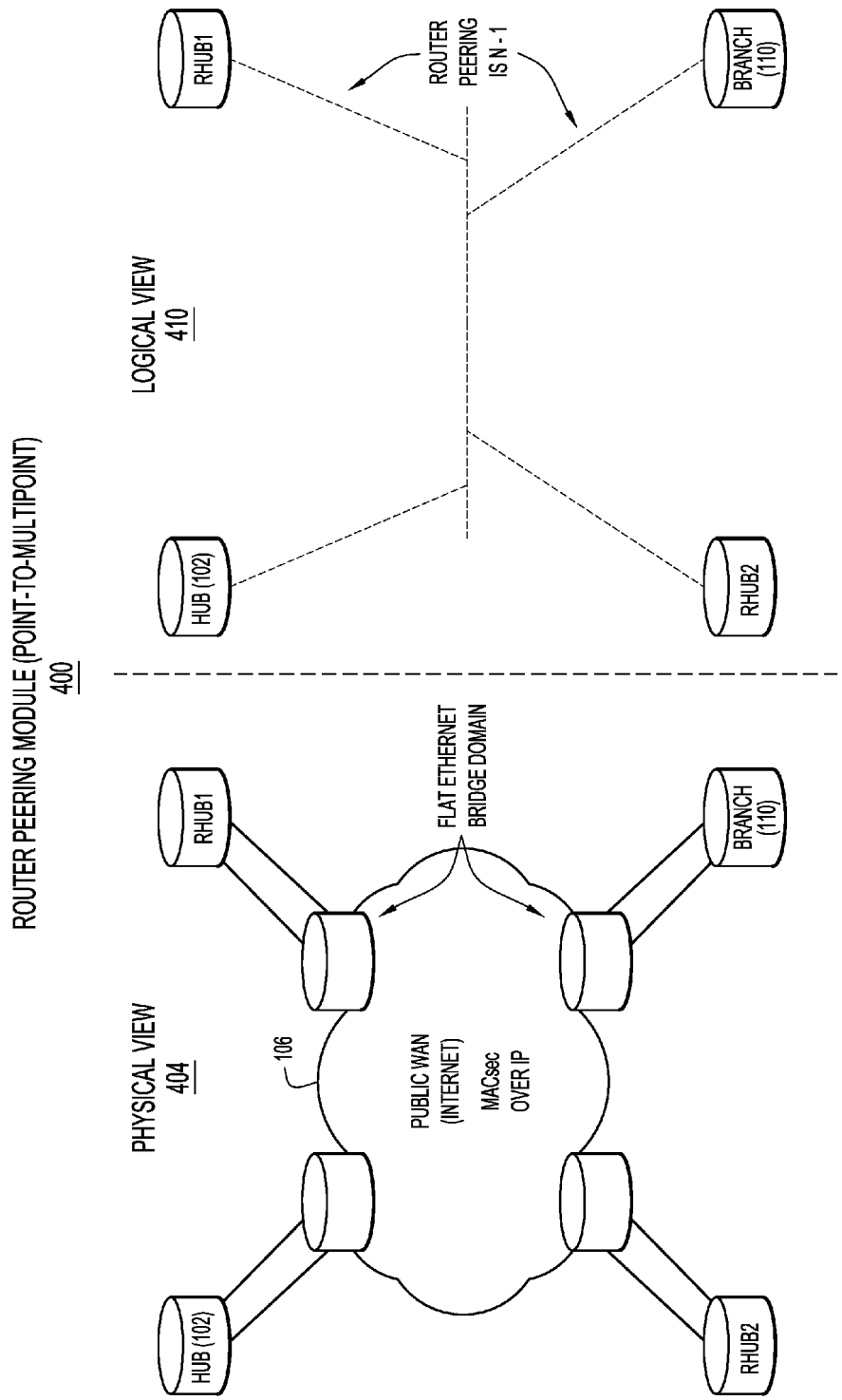
FIG. 4 is a diagram of a router peering model used with multi-hop WAN MACsec that is point-to-multipoint, according to an embodiment.

FIG. 4 is a diagram of a router peering model used with multi-hop WAN MACsec that is point-to-multipoint and that shows a physical view 404 and a corresponding logical view 410 of the peering model, according to an embodiment. In FIG. 4, the routers Hub, Rhub1, Rhub2, and Branch appear as though part of a single flat Ethernet domain, even though in the physical view, intermediary routers are interposed between the peer routers, as shown.

Figure 5:
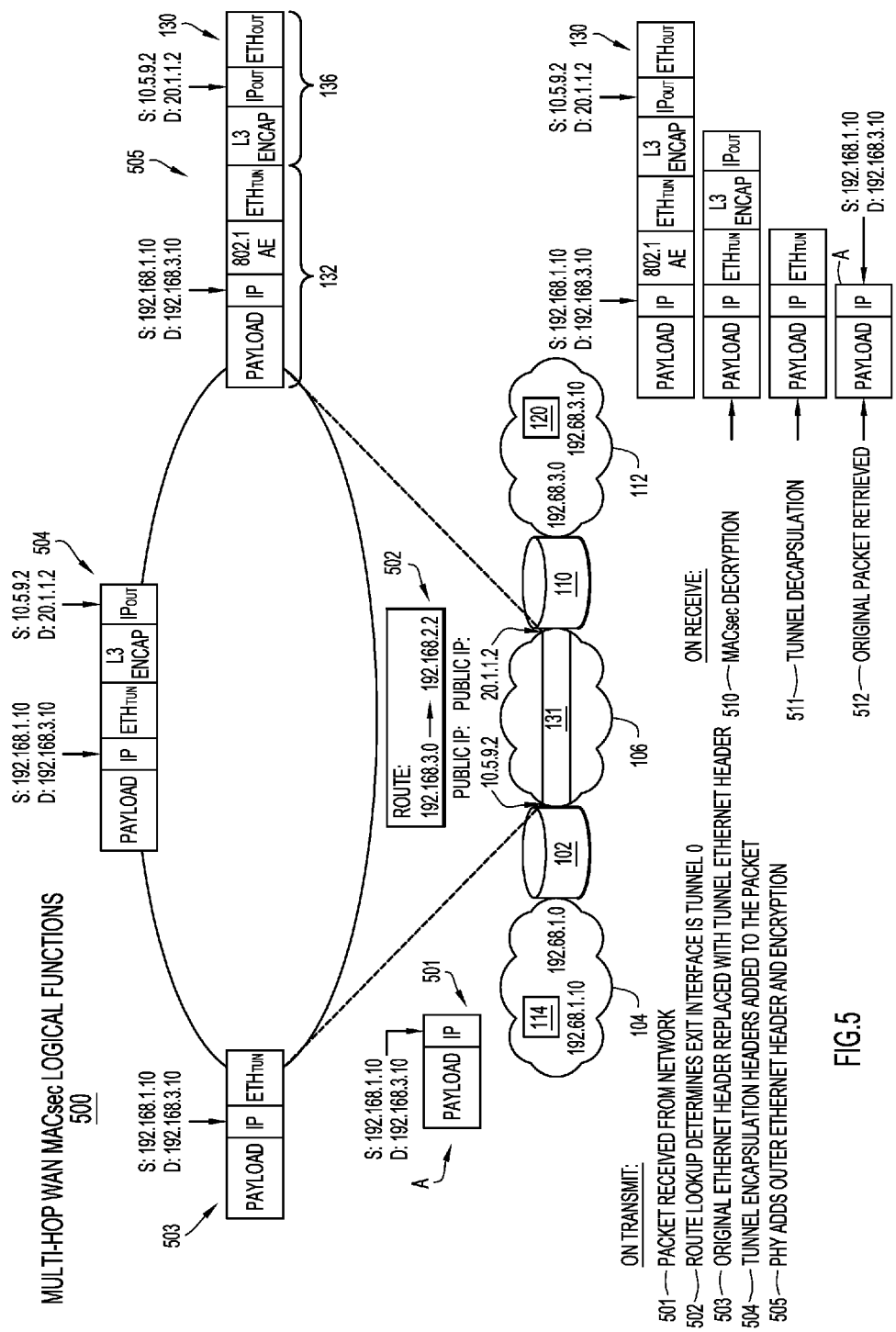
FIG. 5 is a diagram of a network environment that shows logical flows for multi-hop WAN MACsec, according to an embodiment.

FIG. 5 is a diagram of network environment 100 expanded to show logical flows for multi-hop WAN MACsec transmit (egress) packet and receive (ingress) packet processing, according to an embodiment. Logical flows 501-505 are performed for transmit processing and logical flows 510-512 are performed for receive processing, as described below.

At 501, network device 102 receives IP packet A from host device 114. IP packet A has source IP address 192.168.1.10 for host device 114 and destination IP address 192.168.3.10 for host device 120.

At 502, network device 102 examines its internal route table to identify address prefix "3.0" as a destination network and address prefix "2.2" as a next hop, which is a tunnel interface for IP tunnel 131 between network devices 102 and 110.

At 503, since prefix 2.2 is a tunnel interface, network device 102 replaces the existing Ethernet header on IP packet A with an Ethernet tunnel header $Eth_{tun}$, to construct an inner Ethernet frame.

At 504, network device 102 adds L3 encapsulation to the inner Ethernet frame because the tunnel interface belongs to an L2-over-IP (or GRE or other L3 layer) tunnel (tunnel 131). The L3 encapsulation includes an IP header $IP_{out}$ and an L3 encapsulation field "L3 Encap." Adding the L3 encapsulation converts the inner Ethernet frame to an L3 packet. Accordingly, flow 504 is referred to as an L3 encapsulation flow or step.

At 505, at the PHY level, network device 102 adds outer Ethernet header or frame $Eth_{out}$ and performs MACsec protection of inner Ethernet frame to produce frame 130 (where $Eth_{tun}$ and $Eth_{out}$ in FIG. 5 correspond respectively to Eth1 and Eth2 in FIG. 1). Note that in FIG. 5, the ICV and CRC fields of frame 130 are not shown for illustrative compactness. Frame 130 is transmitted over public communication network 106 via IP tunnel 131. Communication network 106 "sees" only IP header $IP_{out}$ in the clear, where $IP_{out}$ includes source and destination IP addresses 10.5.9.2 and 20.1.1.2, which are public addresses of the corresponding egress and ingress interfaces on network devices 102 and 110, such that private IP addresses in subnets 192.168.1.0/24 and 192.168.3.0/24 are encapsulated with the public IP address and can therefore be routed over the communication network.

Network device 110 receives frame 130 from tunnel 131.

At 510, network device 110 removes the MACsec protection from frame 130 (e.g., decrypts MACsec encrypted portions of MACsec protected inner Ethernet frame 132).

At 511, network device 110 performs tunnel decapsulation of (i.e., removal of the L3 encapsulation from) the unprotected frame resulting from operation 510.

At 512, network device 110 retrieves IP packet A.

Figure 6:
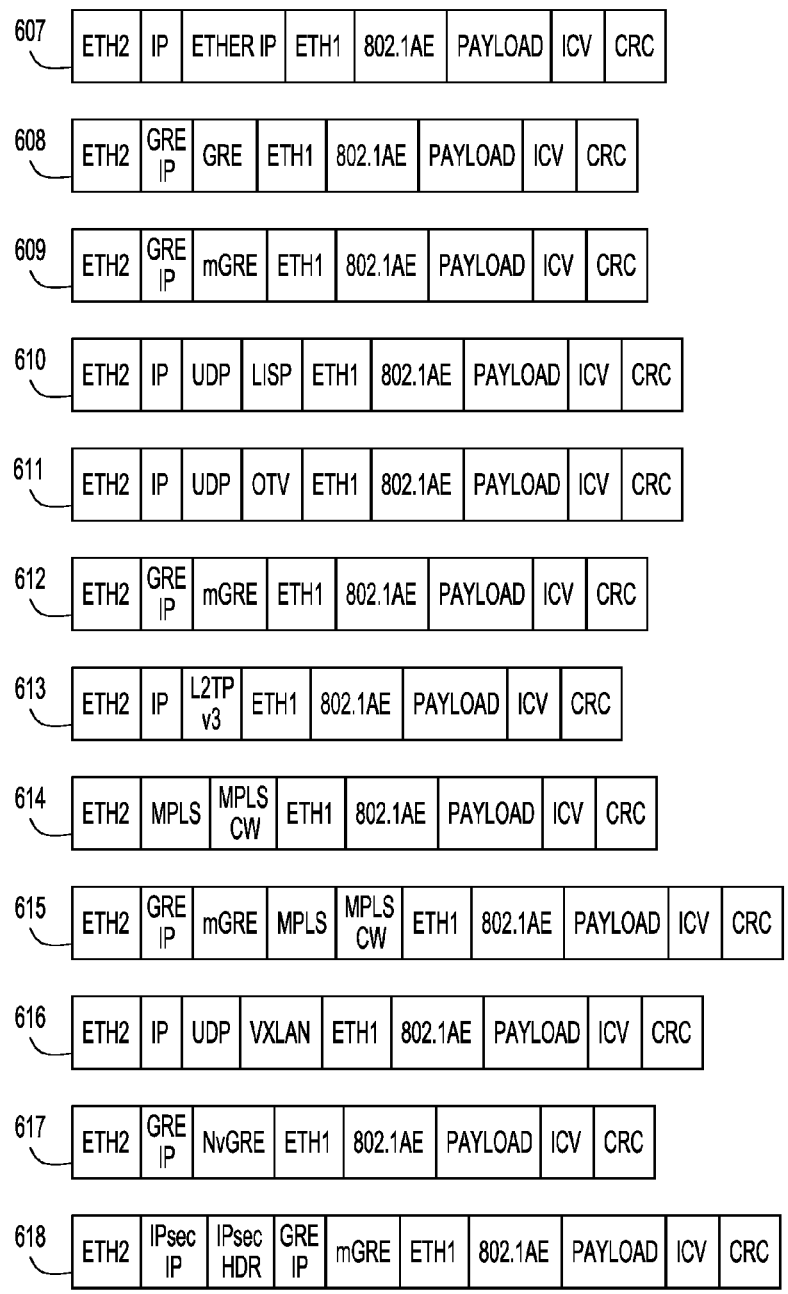
FIG. 6 is a diagram of different multi-hop WAN MACsec frame formats, according to an embodiment.

FIG. 6 is a diagram that shows multi-hop WAN MACsec frame formats 600 for different types of L3 encapsulation fields (i.e., L2-over-L3 tunneling encapsulation fields). All of the frame formats 600 are the same (e.g., similar to frame 130), except for the L3 encapsulation field (which indicates the type of L3 over L2 being used) that is inserted between the fields Eth2 and Eth1. Frame formats 600 include:
 a. An example frame format 607 for Ethernet over IP (EtherIP)—RFC 3378.

b. An example frame format 608 for Ethernet over GRE (P2P) tunneling (Transparent Ethernet Bridging)—RFC 3378.

c. An example frame format 609 for Ethernet over mGRE (Dynamic Multi-Point) tunneling (Transparent Ethernet Bridging)—RFC 1701.

d. An example frame format 610 for layer 2 Locator/ID Separation Protocol (LISP) (LISP Ethernet An example frame)—RFC 6830 (LISP).

e. An example frame format 611 for the Internet Engineering Task Force (IETF) Overlay Transport Virtualization (OTV) (IETF Draft).

f. An example frame format 612 for the Next Hop Resolution Protocol (NHRP) and mGRE over Multi-hop WAN MACsec.

g. An example frame format 613 for layer 2 Tunneling Protocol Version 3 (L2TPv3)—RFC 3931.

h. An example frame format 614 for Ethernet over MPLS (EoMPLS)—RFC 4448.

i. An example frame format 615 for EoMPLS over GRE—RFC 4023 (MPLS over IP or GRE).

j. An example frame format 616 for Virtual Extensible LAN (VxLAN) Ethernet (IETF Draft).

k. An example frame format 617 for Network Virtualization using GRE (NvGRE) over GRE (Transparent Ethernet Bridging)-(IETF Draft).

l. An example frame format 618 for Ethernet over Multipoint GRE (mGRE) tunneling & IPsec (Transparent Ethernet Bridging) for double encryption.

In the ensuing description, egress and ingress packet processing for multi-hop WAN MACsec performed in a network device according to a first embodiment and a second embodiment will be described, beginning with the first embodiment.

First Embodiment

Egress and ingress packet processing performed in a network device for multi-hop WAN MACsec according to a first embodiment is now described.

Figure 7:
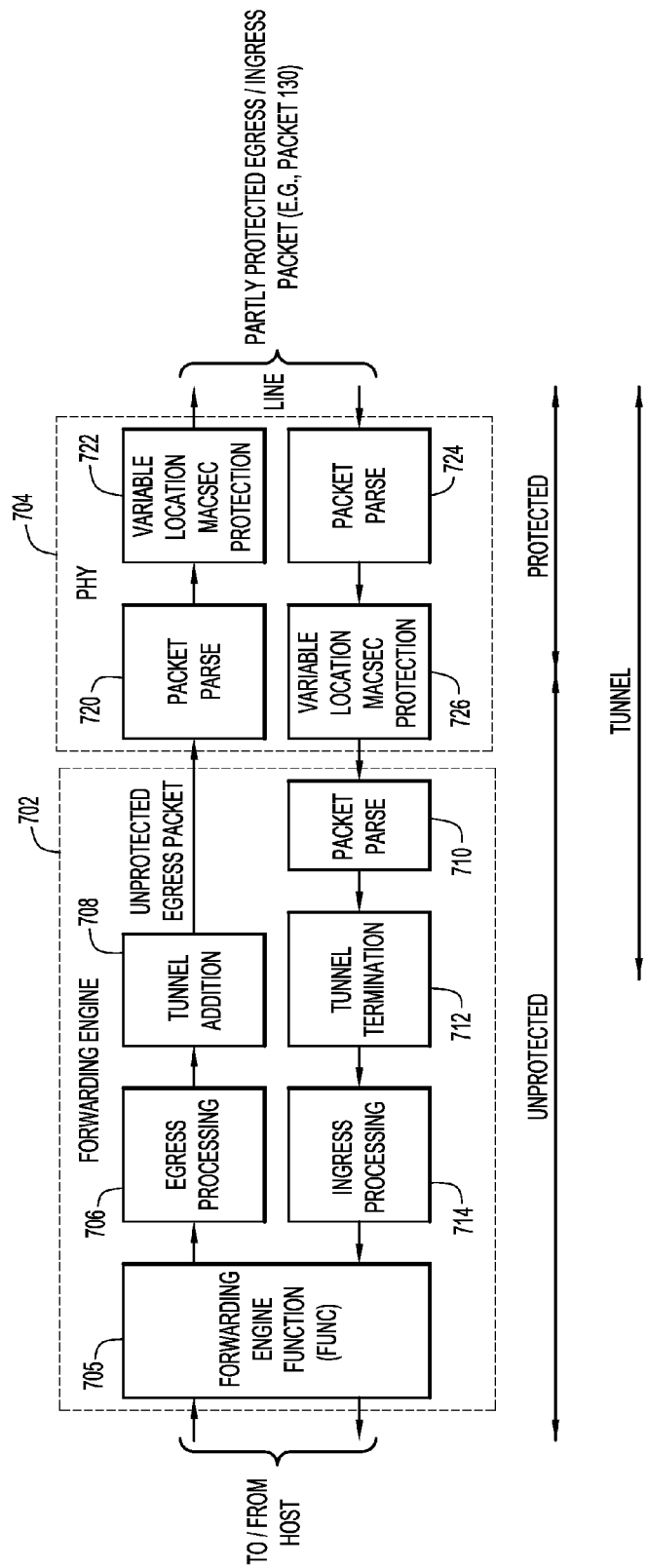
FIG. 7 is a block diagram of an architecture of a network device for processing egress and ingress packets in multi-hop WAN MACsec, according to a first embodiment.

With reference to FIG. 7, there is shown an example architecture 700 of a network device (e.g., network device 102 or 110) for processing egress and ingress packets in multi-hop WAN MACsec, according to the first embodiment. Architecture 700 includes a forwarding engine 702 and a lower-level processor or PHY 704. Forwarding engine 702 includes: for egress packet processing, a forwarding engine function 705, an egress processing function 706, and a tunnel addition function 708; and, for ingress packet processing, a packet parse function 710, a tunnel termination function 712, an ingress processing function 714, and forwarding engine function 705. PHY 704 includes: for egress packet processing, an egress packet parse function 720, a variable location MACsec protection function 722; and for ingress packet processing, an ingress packet parse function 724, and a variable location MACsec protection function 726.

High-level packet encapsulation/egress processing within an IP tunnel that may be performed with/by architecture 700 in accordance with the first embodiment includes the following operations:

a. Forwarding engine 702 receives an Ethernet frame with a payload from a host network. Forwarding engine functions 705-708, as appropriate, (i) perform initial egress processing on the Ethernet frame to add appropriate tunnel headers (e.g., an IP header, an L3 encapsulation, and an outer Ethernet header) to the Ethernet frame, to produce an unprotected egress packet, and (ii) forward the unprotected egress packet to PHY 704.

b. PHY 704 parses the tunnel headers of the egress packet to associate the packet with a MACsec Entity (SecY).

c. PHY 704 optionally uses priority information (e.g., Differentiated Services Code Point (DSCP) bits) in addition to the other selectors to select the SecY.

d. PHY 704 performs MACsec protection/encapsulation of/on the egress packet (specifically of the inner Ethernet frame), leaving the tunnel headers/encapsulation unchanged (i.e., in the clear or unprotected), to produce a partly protected egress packet. PHY 704 transmits the partly protected egress packet to network 106 over a line.

High-level packet decapsulation/ingress processing within an IP tunnel that may be performed with/by architecture 700 in accordance with the first embodiment includes the following operations:

a. PHY 704 receives a partly protected ingress packet from network 106 over a line. The partly protected ingress packet includes unprotected (outer) tunnel headers and a MACsec protected inner Ethernet frame. PHY 704 parses the unprotected tunnel headers to associate the ingress packet with a MACsec SecY.

b. PHY 704 determines a correct MACsec SA for verifying, decrypting, and authenticating the inner Ethernet frame. PHY 704 can optionally remove the SecY and ICV fields.

c. PHY 704, or forwarding engine 702, discards the tunnel encapsulation. In an alternative embodiment, the tunnel encapsulation may not be discarded so that the post decryption packet will have the form <Outer IP Tunnel> <Standard Ethernet Frame>.

d. Forwarding engine 702 performs ingress processing on the inner Ethernet frame, and ultimately forwards the resulting processed frame, e.g., an Ethernet frame, to a host.

Figure 8:
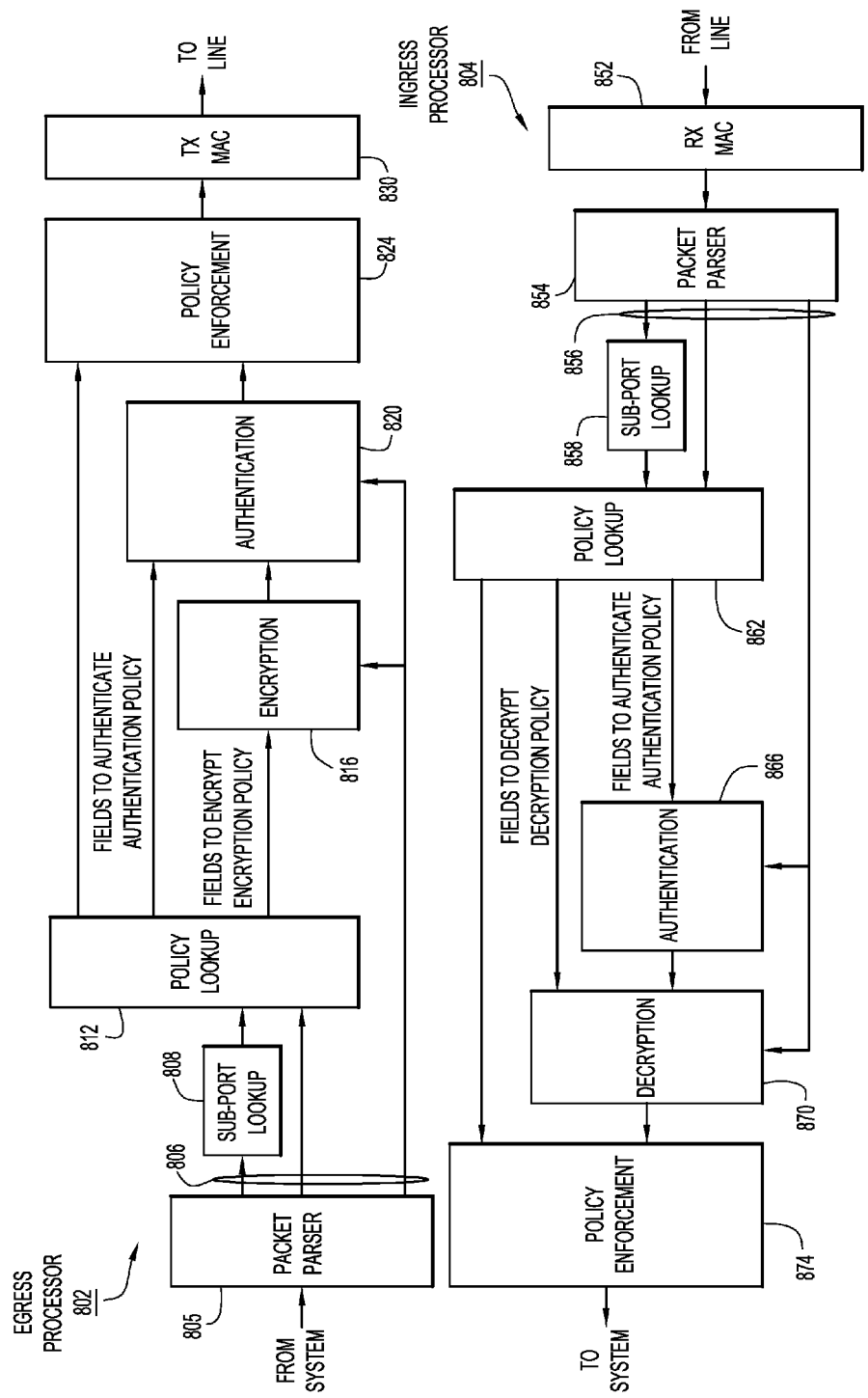
FIG. 8 is a block diagram expanding on a physical layer device (PHY) of FIG. 7, according to the first embodiment.

FIG. 8 is a functional block diagram of an egress processor 802 to perform egress packet processing (at the top of FIG. 8) and an ingress processor 804 to perform ingress packet processing (at the bottom of FIG. 8) for multi-hop WAN MACsec in a network device (e.g., network device 102 or 110), according to the first embodiment. Functional blocks of egress and ingress processors 802 and 804 of FIG. 8 primarily expand on the above described functional blocks of PHY 704 depicted in FIG. 7.

Egress processor 802 receives an egress packet (i.e., an input egress packet) from a host network via a physical port, a MAC receive PHY, and a forwarding engine (e.g., forwarding engine 702) of the network device (collectively denoted "system" in FIG. 8). Egress processor 802 includes a packet parser 805 to parse the egress packet to extract fields 806 (also referred to as parsing results 806) from the egress packet, a sub-port lookup block 808 to lookup sub-port policy based on the parsing results, a policy lookup block 812 to lookup MACsec policy based on the parsing results and the sub-port policy, an encryption engine/block 816 to perform MACsec encryption on various extracted fields according to the MACsec policy, an authentication engine/block 820 to perform integrity protection on various extracted fields according to the MACsec policy, a policy enforcement engine/block 824 to enforce MACsec policy, and a MAC transmit block or PHY 830 to transmit a MACsec over IP packet (i.e., an output egress packet) onto a line. Sub-port lookup block 808 and policy lookup block 812 may each be provisioned a priori with predetermined MACsec policy information that is therefore available/accessible to egress operations described below.

Ingress processor 804 includes a MAC receive block 852 to receive an ingress packet from a physical port of the network device, a packet parser 854 to parse the (received) ingress packet to extract fields 856 from the ingress packet (also referred to as parsing results 856), a sub-port lookup block 858 to lookup sub-port policy based on the parsing results, a policy lookup block 862 to lookup MACsec policy based on the parsing results and the sub-port policy, an authentication engine/block 866 to perform MACsec authentication (and remove integrity protection) according to the MACsec policy, a decryption block/engine 870 to perform MACsec decryption according to the MACsec policy, and a policy enforcement block/engine 874 to enforce MACsec policy. Sub-port lookup block 858 and policy lookup block 862 may each be provisioned a priori with predetermined MACsec policy information that is therefore available/accessible to ingress operations described below.

Egress processing of packets to implement multi-hop WAN MACsec in a network device according to the first embodiment is now described in further detail, first generally, and then with respect to specific tunneling examples, including (i) L3 encapsulation in the form of Ethernet over IP, and (ii) L3 encapsulation in the form of Ethernet over GRE.

Figure 9:
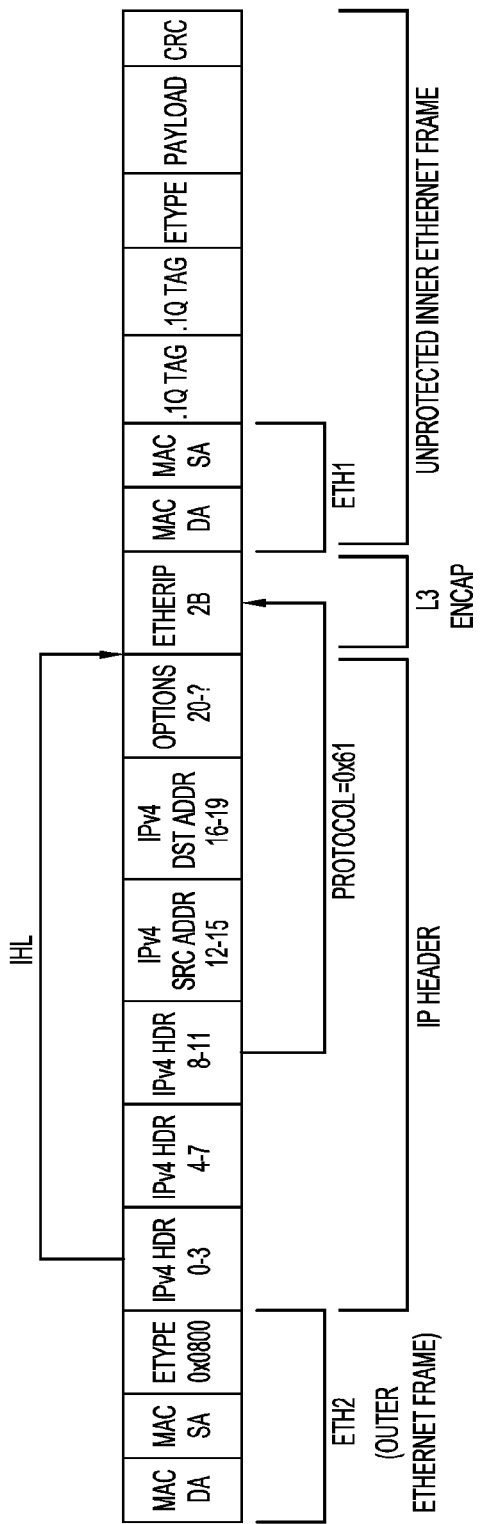
FIG. 9 is an illustration of an input egress packet/frame for Ethernet over IP received at a PHY, according to an embodiment

Egress processing includes the following operations (a)-(i), generally. An egress packet arrives at a receive PHY of a network device (e.g. network device 102), and is provided to packet parser 805. FIG. 9 is an illustration of an example egress packet 900 for Ethernet over IP that arrives at the network device. The received egress packet may be referred to as an "input" egress packet.

a. Packet parser 805 parses the received egress packet to extract an IP Address and DSCP bits from an IP header in the received egress packet.

b. These fields, combined with a physical port on the network device that received the egress packet are used by sub-port lookup block 808 as a lookup key into an egress mapping table, which may be stored in any suitable data structure in the sub-port lookup block, such as a ternary content-addressable memory (TCAM). This process may be referred to as "sub-port lookup." In an alternative embodiment, operations (a) and (b) may be replaced with an operation including identifying a SecY using a destination of the egress packet.

c. The result of the sub-port lookup is an index #, which is mapped into a sub-port # having a 1:1 relationship with a SecY. The egress mapping table also allows the entire IP tunnel (e.g., tunnel 131) to be marked as unprotected.

d. Sub-port lookup block 808 provides the index # and/or sub-port # to policy lookup bloc 812. Policy lookup block 812 uses the index #/sub-port # to lookup a sub-port policy in an egress sub-port/SecY and Secure Channel (SC) policy table stored in the policy lookup block. An alternative to operations (a)-(d) is to pass a header in the egress packet which identifies the SecY, SC and controlled port or uncontrolled port of the packet. This avoids the complex parser in the egress direction.

e. The index #/sub-port # is also used by policy lookup block 812 to map to an active security association (SA) for the SecY. Additionally, an associated SA policy table is looked up within an egress SA policy table.

f. An inner Ethernet frame and an outer frame of the egress packet is checked to identify if the egress packet should be steered through the uncontrolled port of the SecY.

g. The egress policy accessed in operations (d) and (e) dictates if and where to insert the SecTag in the egress packet and which fields of the egress packet to authenticate with an ICV.

h. The SecTag and ICV are inserted into the egress packet (specifically, into the inner Ethernet frame) if applicable. In another embodiment, the CE (or host) may have appended place holders to the egress packet for the SecTag and ICV, which are replaced with the valid SecTag and ICV at this operation.

i. Accounting is provided per SecY and sub-port. Each sub-port has a controlled and uncontrolled port accounting.

A specific example of egress processing for L3 encapsulation in the form of Ethernet over IP is now described.

Figure 10A:
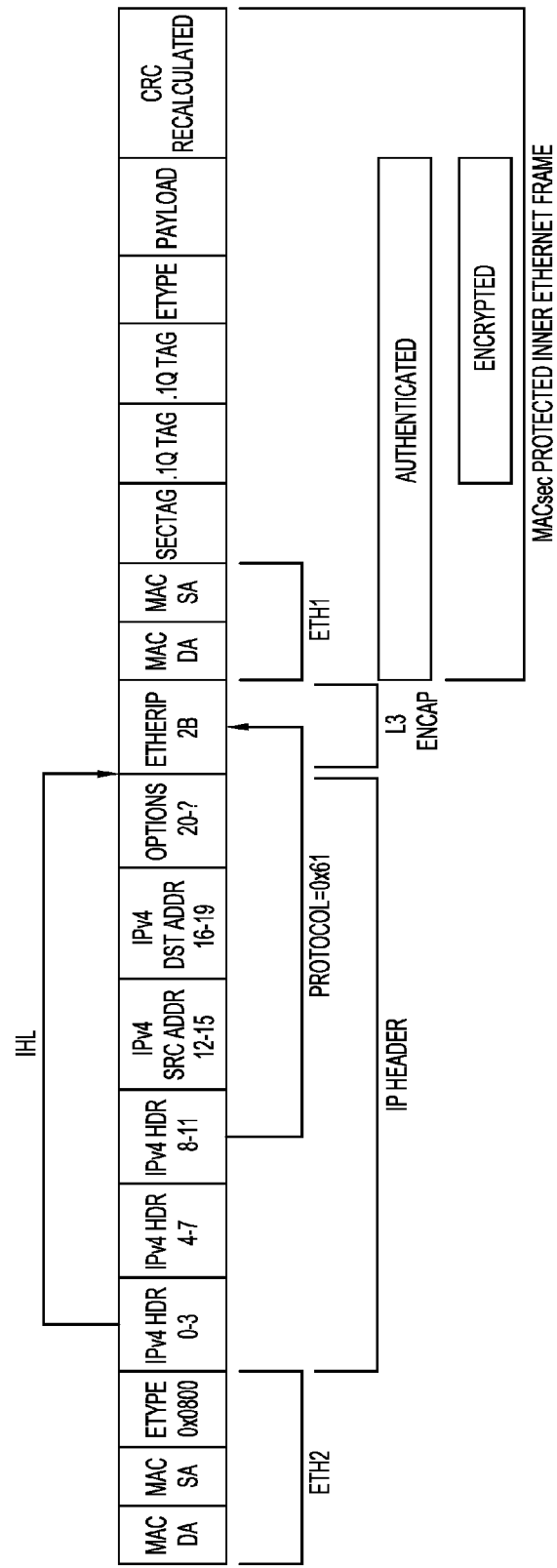
FIG. 10A is an illustration of a protected output egress packet/frame for Ethernet over IP (derived based on the input egress frame of FIG. 9) for transmission, according to an embodiment.
Figure 10B:
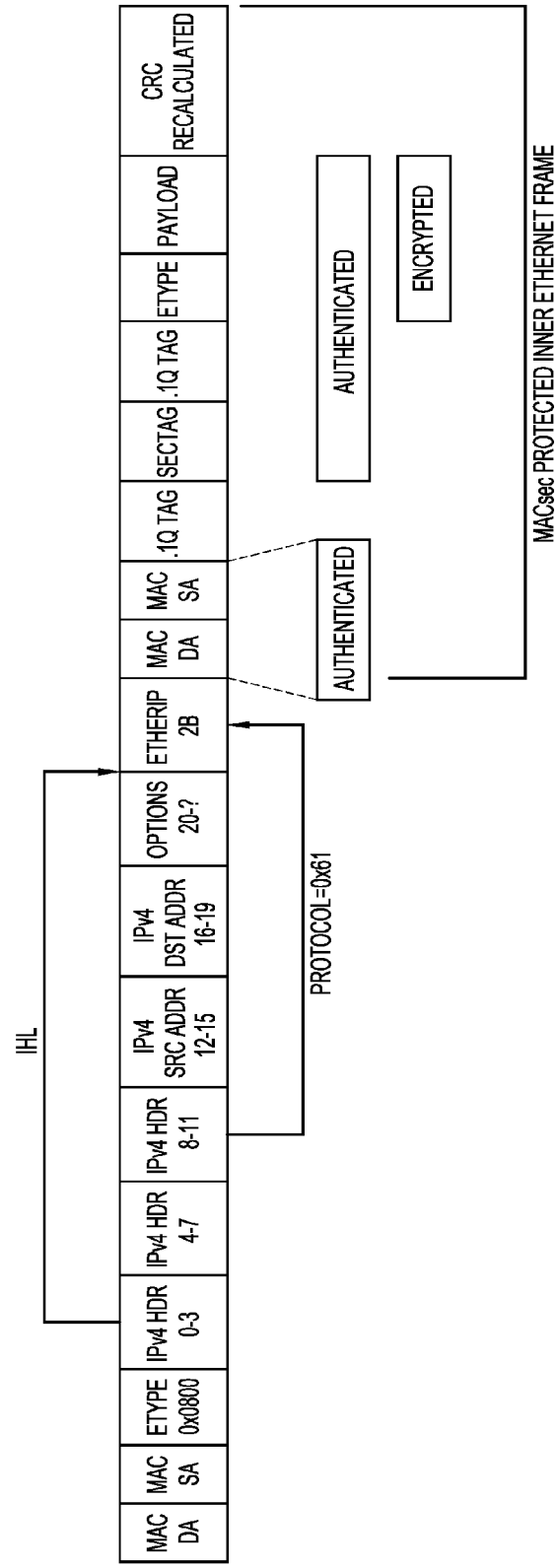
FIG. 10B is an illustration of a protected output egress packet/frame for Ethernet over IP protected similar to the packet/frame of FIG. 10A, except that some virtual local area network (VLAN) tags on an inner Ethernet frame are left in the clear, according to an embodiment.

An input egress packet, e.g., egress packet 900, arrives at a network device. Egress packet 900 includes packet fields corresponding to an outer Ethernet frame or header Eth2, an IP header (which may also be denoted simply a "IP"), an L3 encapsulation field L3 ENCAP, and an inner Ethernet frame that includes an inner Ethernet header Eth1. Egress packet 900 is unprotected, i.e., all of its fields are in the clear.

a. Packet parser 805 performs the following functions on the egress packet. Parser 805 extracts relevant fields from the egress packet necessary to identify a policy associated with the packet. Packet parser 805 can parse both the inner and outer Ethernet frames of the egress packet to define the policy.

i. Although not strictly required, typically the outer Ethernet frame and IP header dictates the sub-port the egress packet is associated with, and therefore the appropriate MACsec SecY. The inner Ethernet packet typically is used to identify packets which should not be authenticated or encrypted because they are used for session establishment.

ii. The following are the IP header fields extracted for Ethernet over IP by packet parser 805:
   1. Packet parser 805 parses down the egress packet to find an ETYPE of 0x0800, which indicates IPv4.
   2. Packet parser 805 parses further down the egress packet and extracts an Internet header length (IHL), an IP destination address, a priority, and protocol fields.
   3. If protocol field=0x61 then the egress packet is an Ethernet over IP frame.
   4. Based on the IHL parsing skips to the Ethernet IP Header.
   5. The EthernetIP header is a fixed size.
   6. Packet Type is accessed.

iii. The following are the inner Ethernet fields which are extracted by packet parser 805:
   1. MAC_DA.
   2. 802.1Q tags.
   3. ETYPE.
   4. Packet Type.
   5. Additional free-form payload bits, which allow unknown headers to also be used as part of the SecY association.

b. Sub-port lookup
  i. Sub-port lookup block 808 uses the fields extracted by packet parser 805 to identify which SecY the egress packet is associated with.

ii. In this example, an IP destination field and optionally the priority fields are used to associate the packet with a SecY.
c. Policy Lookup
  i. Policy lookup block 812 looks up policy that defines the exact policy to assign to the egress packet.
  ii. There is policy associated with the SecY which is looked up based on the sub-port lookup result.
  iii. There is policy associated with the SC and SA which is looked up based on SecY and optionally the priority fields.
  iv. Included in the policy is information about which bytes of the egress packet to encrypt (e.g., the entire Ethernet frame of the egress packet, just the inner Ethernet frame of the egress packet, or other fields of the Ethernet frame) and authenticate via blocks 816 and 820.
  v. Entire sub-ports can be defined as being unsecured and the policy will dictate that no fields of the packet are encrypted or authenticated.
  vi. Some egress input packets associated with a sub-port can be defined as being unsecured and the policy will dictate that for those egress input packets no fields are encrypted or authenticated, but other egress input packets for that same sub-port will be authenticated and encrypted.
d. Encryption
  i. Encryption block 816 (also referred to as an encryption engine 816) takes the packet data passed to it by packet parser 805 and the policy information from policy lookup block 812 and encrypts the appropriate fields of the packet.
e. Authentication
  i. Authentication block 820 (also referred to as authentication engine 820) takes the packet data passed to it by encryption engine 816 and the policy information from policy lookup block 812 and authenticates the appropriate fields of the packet. It is possible that there are multiple unique authentication regions within the packet.
  ii. The ICV, if required, is inserted into the packet by authentication block 820.
f. Policy Enforcement
  i. Packets can be discarded, modified or counted by policy enforcement block/engine 824 as dictated by the looked up policy.
  ii. A typical modification is to insert the SecTag into the packet. In another embodiment, the valid SecTag may replace a place holder for the SecTag, which avoids packet expansion.
  iii. The protected egress packet (also referred to as an output egress packet) is transmitted. FIG. 10A is an illustration of an Ethernet over IP protected packet 1000A (derived based on the input egress packet of FIG. 9) that is transmitted as the protected output egress packet, according to an embodiment. The protected output egress packet of FIG. 10A includes packet or frame fields corresponding to outer Ethernet header or frame Eth2, an IP header (denoted simply "IP"), an L3 encapsulation field L3 ENCAP, and a MACsec protected inner Ethernet frame that includes an inner Ethernet header Eth1. The Ethernet over IP protected packet of FIG. 10A may also be referred to as a partly protected output egress packet because the outer portion of the packet is in the clear while the inner Ethernet frame is MACsec protected.
  iv. The SecTag is inserted and the ICV is calculated. The exact bytes to authenticate and encrypt is also looked up from the policy.
  v. It is also possible based on policy to leave some of the inner VLAN tags in the clear if desired. FIG. 10B is an illustration of an Ethernet over IP protected packet 1000B similar to the output egress packet of FIG. 10A, except that some VLAN tags are left in the clear, according to an embodiment.
  vi. Similar functionality to that described above can be used to process IPv6 packets.
  vii. Packets can also be transmitted without modification based on policy lookup.

A specific example of egress processing for L3 encapsulation in the form of Ethernet over GRE is now described.

Figure 11:
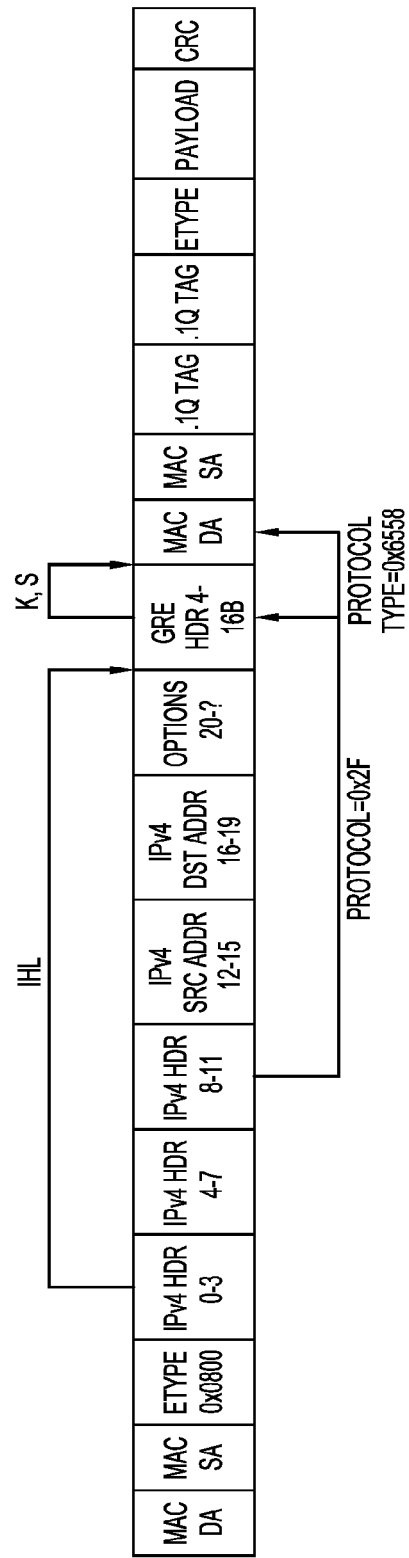
FIG. 11 is an illustration of an input egress packet/frame for an Ethernet over Generic Routing Encapsulation (GRE) tunneling that arrives at a PHY, according to an embodiment.

An egress packet (i.e., egress input packet) arrives at a PHY of a network device. FIG. 11 is an illustration of a packet/frame format for an Ethernet over GRE tunneling (RFC-1701) egress packet 1100 that arrives at the PHY.

Figure 12:
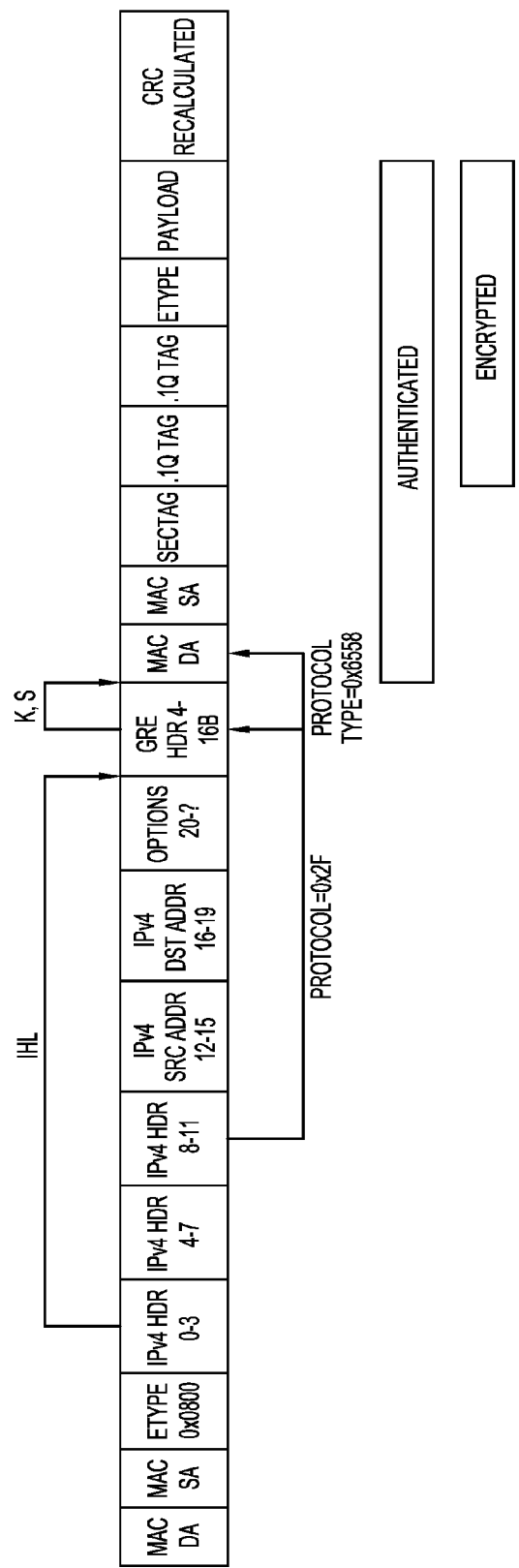
FIG. 12 is an illustration of a protected output egress packet/frame for an Ethernet over GRE tunneling protected packet, according to an embodiment.

The operations used to process the egress packet are similar to those described above in the example for Ethernet over IP, except that packet parser 805 performs different operations, as follows.
  a. The following are the IP header fields extracted Ethernet over GRE by the packet parser:
    i. Packet parser 805 parses the packet to find an ETYPE of 0x0800, which indicates IPv4.
    ii. Packet parser 805 parses the packet further and extracts the IHL, IP destination address, and protocol fields.
    iii. If Protocol Field=0x2F then a GRE tunnel is indicated.
    iv. Based on the IHL, packet parser 805 skips to the GRE header.
    v. The protocol header in GRE is extracted:
      1. If the protocol header is 0x6558 then an Ethernet frame is indicated.
      2. Based on K and S fields, the MAC_DA is located.
    vi. The remainder of the egress operations are as described above. The policy will be enforced based on the results of the policy lookup and a protected packet will be transmitted. FIG. 12 is an illustration of a frame format for an Ethernet over GRE tunneling (RFC-1701) protected packet 1200.

Ingress processing in accordance with the first embodiment is now described in detail, first generally, and then with respect to a specific example of L3 encapsulation in the form of Ethernet over IP.

An ingress packet arrives at a PHY of a network device (e.g. network device 102), and is provided to packet parser 854. The ingress packet may be an output egress packet as described above that has been transmitted by a peer network device over an IP tunnel, as described above.
  a. Packet parser 854 parses the ingress packet to extract an IP Address and DSCP bits from an IP header in the ingress packet.
  b. These fields, combined with the physical port are provided to sub-port lookup block 858, which uses the fields as a lookup key into an ingress sub-port mapping table (e.g., sub-port TCAM) stored in the sub-port lookup block.
  c. The result is an index # which is mapped into a sub-port # (which has a 1:1 relationship with a SecY). The ingress sub-port mapping table also allows an entire tunnel (e.g., tunnel. 131) to be marked as unprotected.

d. The sub-port # is combined with s Secure Channel Identifier (SCI) to identify a Secure Channel (SC), which is provided to policy lookup block 862.

e. Policy lookup block 862 uses the sub-port # to lookup an SC policy in an ingress SC policy table stored in the policy lookup block.

f. The result of the SC+association number (AN) extracted from the ingress packet maps to a specific SA in an ingress SC+AN to SA map & policy table stored in policy lookup block 862. This map and policy table points to an ingress SA policy table.

g. The accessed policy is used to process the ingress packet in authentication block 866 and decryption block 870, which includes removing the SecTag and ICV if specified in the policy.

h. Based on policy, the policy enforcement module 874 may discard some ingress packets based on a policy violation.

A specific example of ingress processing is now described with respect to L3 Encapsulation in the form of Ethernet over IP.

a. An ingress packet (e.g., packet 1000A) arrives, and packet parser 854 performs the following functions on the ingress packet.
  i. Packet parser 854 extracts relevant fields from the packet necessary to identify a policy associated with the packet. Packet parser 854 can parse both inner and outer Ethernet frames of the ingress packet to define the policy.
    1. Although not strictly required, typically the outer Ethernet frame and IP header dictates a sub-port the packet is associated with, and therefore the appropriate MACsec SecY. The inner frame typically is used to identify packets which should not be authenticated or encrypted because they are used for session establishment.
    2. For inner frames which have been encrypted some of the inner payload will not be visible to packet parser 854.
  ii. The following are IP header fields extracted for Ethernet over IP by packet parser 854:
    1. Packet parser 854 parses the ingress packet to find an ETYPE of 0x0800, which indicates IPv4.
    2. Packet parser 854 parses further down the ingress packet and extracts the IHL, IP Source Address, priority and protocol fields.
    3. If protocol field=0x61 then an Ethernet over IP packet is indicated.
    4. Based on the IHL packet parser 854 skips to the MAC_DA.
    5. Packet type.
  iii. The following are the inner Ethernet fields which are extracted by packet parser 854:
    1. MAC_DA+MAC SA.
    2. 802.1Q tags if not encrypted.
    3. ETYPE if not encrypted.
    4. SecTag if present.
    5. Packet Type.

b. Sub-port lookup
  i. Sub-port lookup block 858 uses the fields extracted by packet parser 854 to identify which SecY the packet is associated with.
  ii. In this example, the IP source field and optionally the priority fields are used to associate the packet with the SecY.

c. Policy Lookup
  i. Policy lookup block 862 looks up policy that defines the exact policy to assign to the packet.
  ii. There is policy associated with the SecY which is looked up based on the Sub-port lookup result.
  iii. There is policy associated with the SC and SA which is looked up based on SecY, SCI and optionally the priority fields.
  iv. Included in the policy is information about which bytes of the packet are encrypted and authenticated.
  v. Entire sub-ports can be defined as being unsecured and the policy will dictate that no fields of the packet are encrypted or authenticated.
  vi. Some packets associated with a sub-port can be defined as being unsecured and the policy will dictate that for those packets no fields are encrypted or authenticated, but other packets for that same sub-port will be authenticated and encrypted.

d. Authentication
  i. Authentication block/engine 866 takes the packet data passed to it by packet parser 854 and the policy information from policy lookup block 862 and authenticates the appropriate fields of the packet. It is possible that there are multiple unique authentication regions within the packet.
  ii. The ICV if defined by policy is stripped from the packet e. Decryption
  i. Decryption block/engine 870 takes the packet data passed to it by authentication block/engine 866 and decrypts the appropriate fields in the packet.

f. Policy Enforcement
  i. Packets can be discarded, modified or counted by policy enforcement block/engine 874 as dictated by the policy lookup block.
  ii. A typical modification is to strip the SecTag from the packet or to discard the packet on security violation.

g. The packet is sent to a host.

Figure 13:
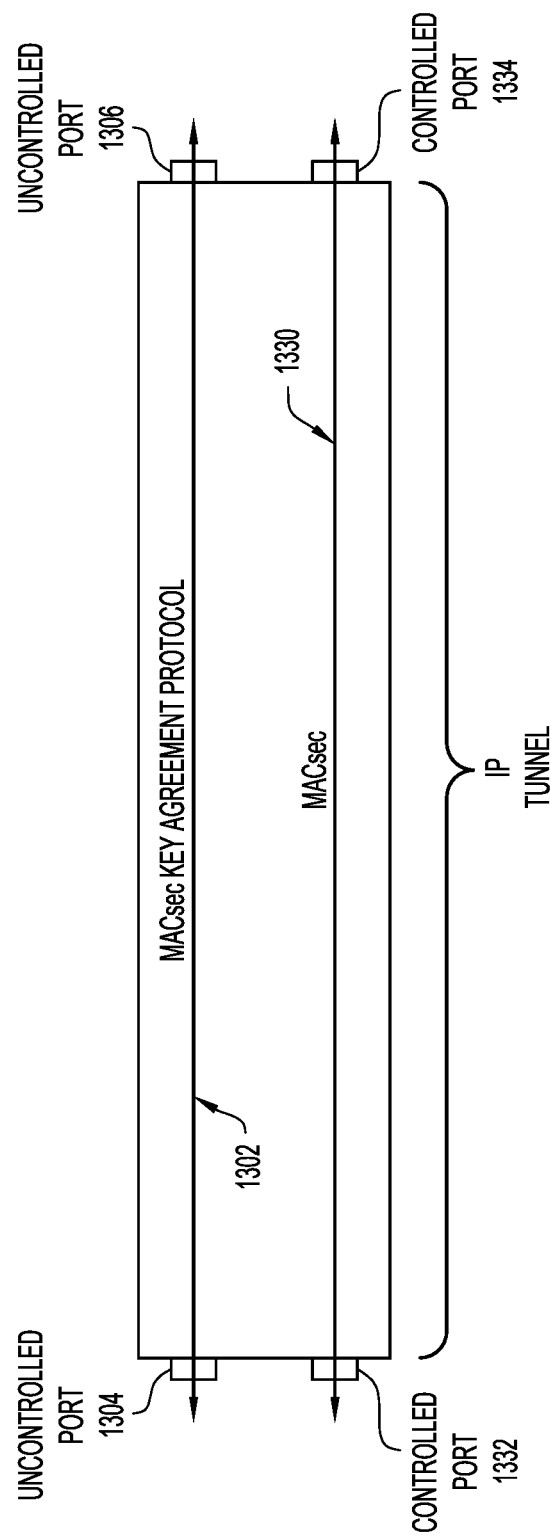
FIG. 13 is a diagram of tunnel endpoint communication using a MACsec agreement protocol, according to an embodiment.

FIG. 13 is a diagram of tunnel endpoint communication using a MACsec key agreement protocol, according to an embodiment. In FIG. 13, at 1302, uncontrolled ports 1304 and 1306 of respective peer network devices 102 and 110 (at either end of network tunnel 131) exchange messages according to the MACsec key agreement protocol to synchronize key states with each other. Once the key states are negotiated, at 1330, controlled ports 1332 and 1334 of respective network devices 102 and 110 exchange MACsec protected frames.

Figure 14:
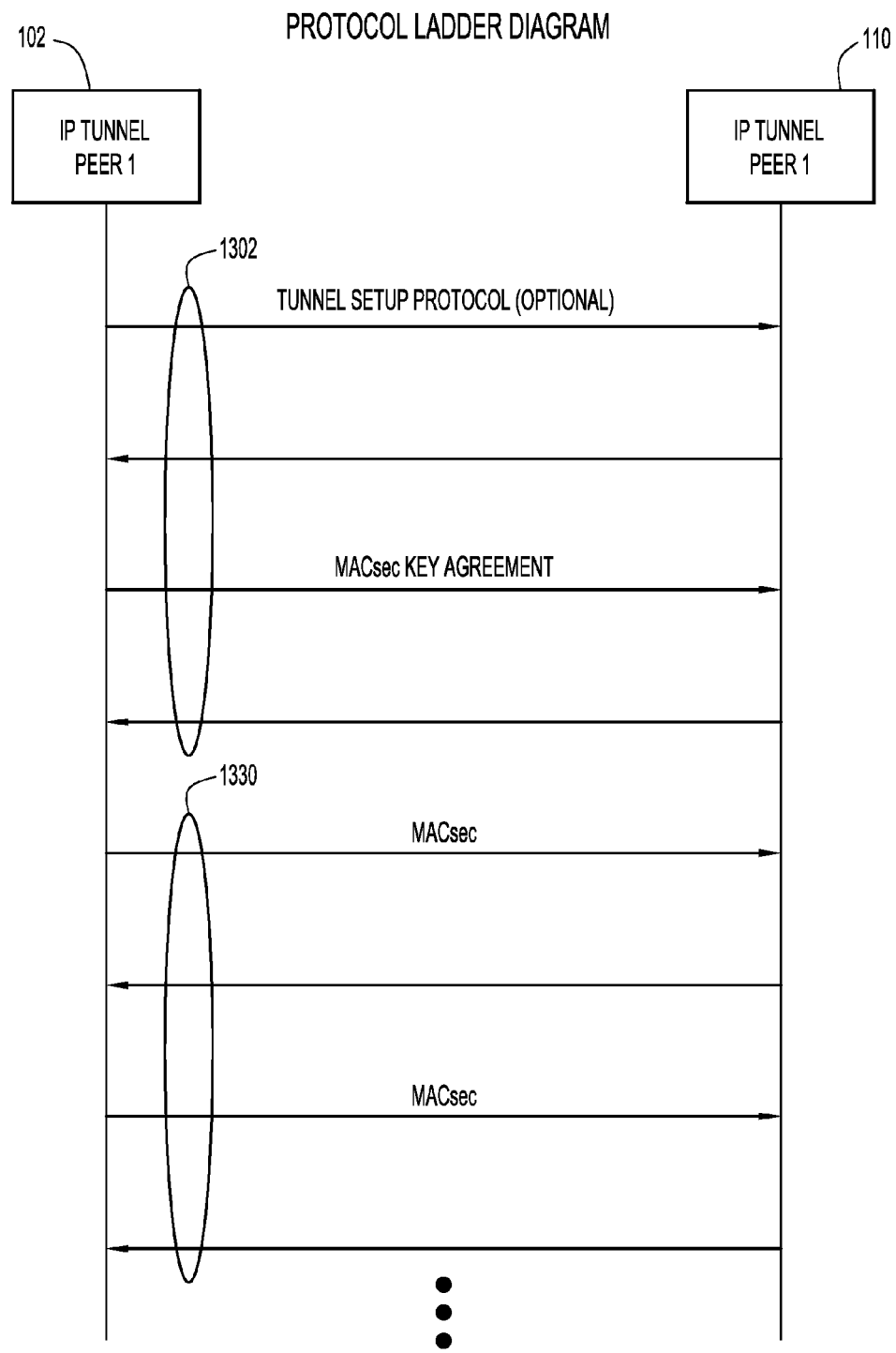
FIG. 14 is a protocol ladder diagram for the tunnel endpoint communication of FIG. 13, according to an embodiment.

FIG. 14 is a protocol ladder diagram for the tunnel endpoint communication of FIG. 13.

Figure 15:
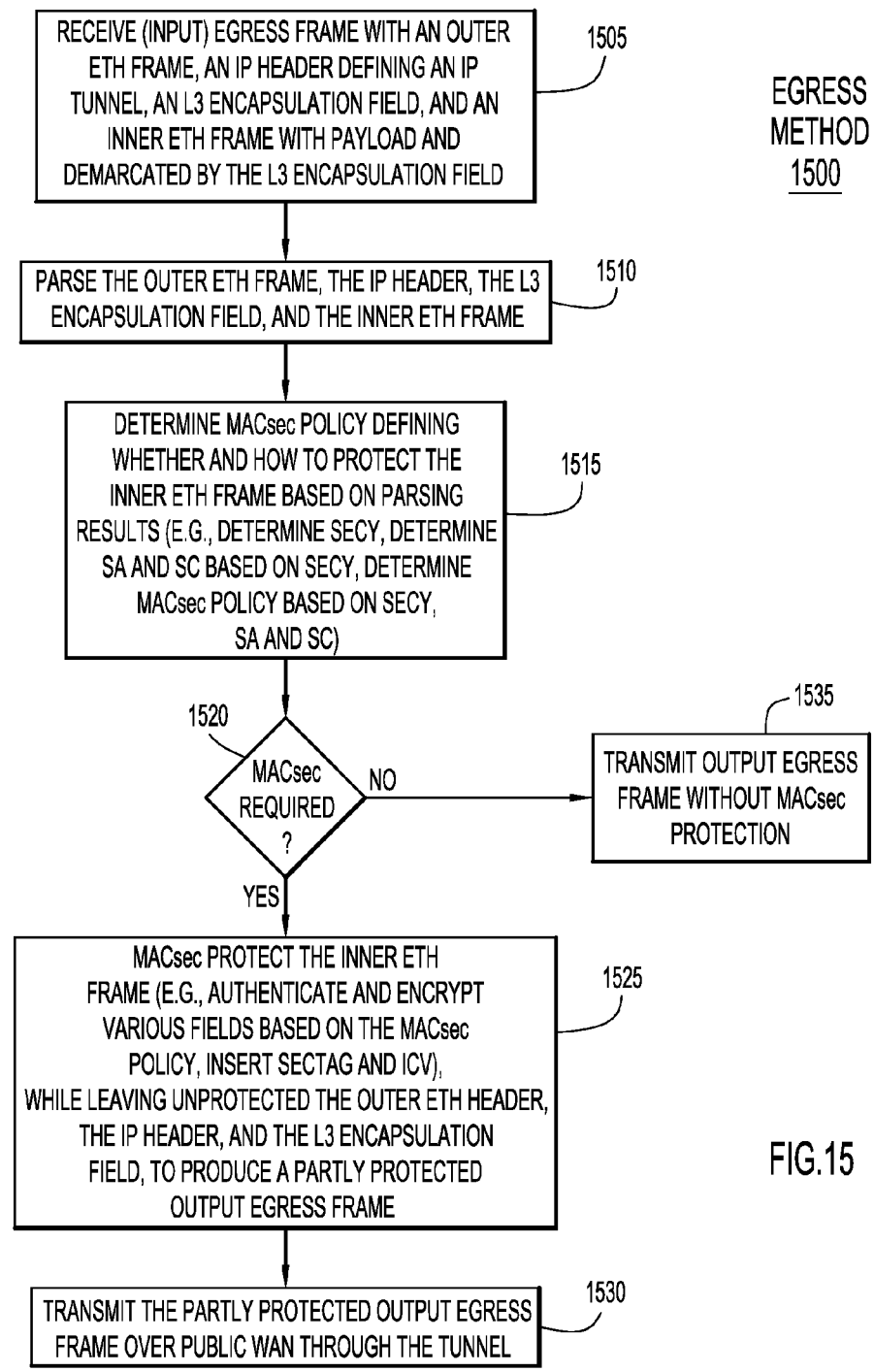
FIG. 15 is a flowchart of a method of performing egress packet/frame processing performed by an egress processor of a network device, according to the first embodiment.

With reference to FIG. 15, there is a flowchart of an example method 1500 of egress packet or frame processing performed by egress processor 802 of a network device, according to the first embodiment. Method 1500 includes and/or summarizes egress operations described above. In the description of method 1500, the term "egress frame" is synonymous and interchangeable with the term "egress packet" used above. Also, "Ethernet" is abbreviated to "Eth" in FIG. 15. All of the operations of method 1500 may be performed in a single network device (e.g., network device 102 or 110), that is, without transmitting packets between network devices over a line connected with a network.

At 1505, egress processor 802 receives from a source device (e.g., host 102) an egress frame in the form of an Ethernet frame. The egress frame may be referred to as an input egress frame. The egress frame includes: an outer Ethernet frame or header including a MAC SA, a MAC DA, an Ethertype field; an IP header defining an IP tunnel between the network device (e.g., network device 102) and a peer network device (e.g., network device 110) over a public wide area network (e.g., public network 106); an L2-over-L3 encapsulation field (i.e., also referred to as "an L3 encapsulation field" or more simply as an "L3 encapsulation") identifying a tunnel protocol; and an inner Ethernet frame with a payload and that is demarcated by the L3 encapsulation.

At 1510, processor 802 parses the outer Ethernet frame, the IP header, the L3 encapsulation, and the inner Ethernet frame and, based on results of the parsing, performs next operations 1515-1535.

At 1515, processor 802 determines a MACsec policy that defines whether and how to MACsec protect the inner Ethernet frame. To do this, processor 802 (i) determines a SecY based on a destination IP address of the IP tunnel (extracted in the parsing) and optionally on a physical port at which the network device received the Ethernet frame, (ii) determines an SA and an SC based on at least the MACsec entity, and (iii) determines the MACsec policy based on the SecY, the SA, and the SC. The SecY may be determined based on the destination IP address, the physical port, and also priority bits also extracted from the IP header, and a sub-port associated with the ingress frame that is mapped to the SecY. Also, the SA and the SC may be determined based on the sub-port.

Assuming the MACsec policy determined at 1515 indicates that the inner Ethernet frame is to be protected, the MACsec policy identifies which ones of an Ethernet header, an Ethernet type field, and the payload of the inner Ethernet frame, available from the parsing results, are to be MACsec protected.

At 1520, processor 802 determines whether the MACsec policy indicates that the inner Ethernet frame is to be protected or is not to be protected. If the policy indicates MACsec protection, flow proceeds to 1525. Otherwise flow proceeds to 1535.

At 1525, processor 802 MACsec protects the inner Ethernet frame according to the MACsec policy, while leaving unprotected the IP header and the L3 encapsulation, to produce a partly protected output egress frame. To MACsec protect the inner Ethernet frame, processor 802 may authenticate, encrypt, or both authenticate and encrypt one or more the Ethernet header, the Ethernet type field, and the payload of the inner Ethernet frame according to the MACsec policy, and also insert a SecTag and an ICV into the inner Ethernet frame.

At 1530, processor 802 transmits the partly protected output egress frame to the peer network device over the IP tunnel of the public wide area network.

If it is determined at 1520 that the MACsec policy indicates that the inner Ethernet frame is not to be MACsec protected, at 1535 processor 802 does not MACsec protect the inner Ethernet frame and simply transmits the unprotected output egress frame to the tunnel.

Figure 16:
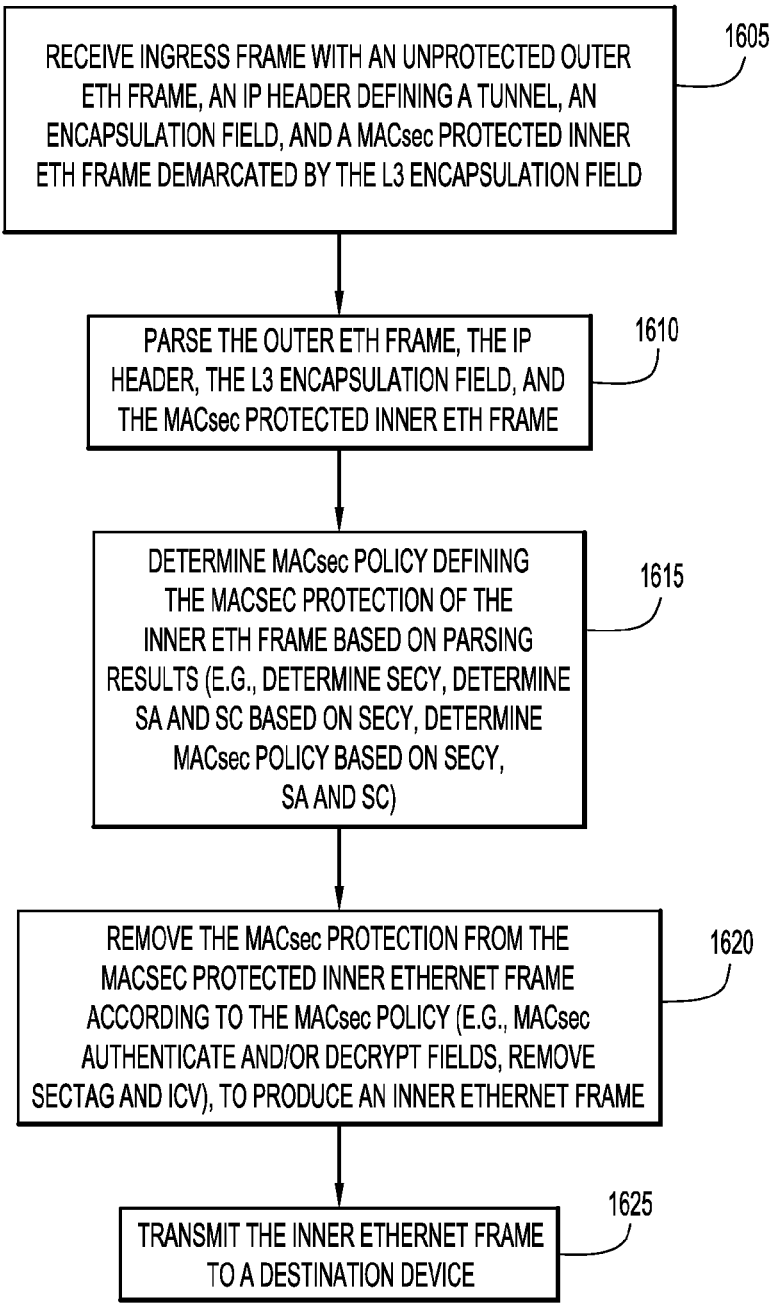
FIG. 16 is a flowchart of a method of performing ingress packet/frame processing performed by an ingress processor of a network device, according to the first embodiment.

With reference to FIG. 16, there is a flowchart of an example method 1600 of ingress packet or frame processing performed by ingress processor 804 of a network device, according to the first embodiment. Method 1600 includes and/or summarizes ingress operations described above. All of the operations of method 1600 may be performed in a single network device (e.g., network device 102 or 110), that is, without transmitting packets between network devices over a line connected with a network.

At 1605, ingress processor 804 of a network device (e.g., network device 102) receives an ingress frame (referred to as an "ingress packet" above) transmitted by a peer network device (e.g., network device 110) to the network device over a public WAN (e.g., network 106) via an IP tunnel (e.g., tunnel 131). The ingress frame includes an unprotected outer Ethernet header, an unprotected IP header defining the IP tunnel, an unprotected layer 3 encapsulation identifying an L2-over-L3 tunnel protocol, and a MACsec protected inner Ethernet frame carrying a payload destined for a destination device (e.g., host device 114). The MACsec protected inner Ethernet frame is demarcated by the unprotected L3 encapsulation.

At 1610, processor 804 parses the outer Ethernet frame, the IP header, the L3 encapsulation, and protected inner Ethernet frame based on the Ethertype field and the layer 3 encapsulation, and the MACsec protected inner Ethernet frame and, based on results of the parsing, performs next operations 1615-1625.

At 1615, processor 804 determines a MACsec policy that defines the MACsec protection on the MACsec protected inner Ethernet frame. To do this, processor 804 performs similar operations used by processor 802 at operation 1515, described above. The MACsec policy defines the MACsec protection on an Ethernet header, an Ethernet type field, and the payload of the inner Ethernet frame.

At 1620, processor 804 removes the MACsec protection from the MACsec protected inner Ethernet frame according to the MACsec policy, to produce an inner Ethernet frame. Removal of the MACsec protection may include authentication and decryption of one or more fields in the inner Ethernet frame, as well as removal of the SecTag and ICV.

At 1625, processor 804 transmits the inner Ethernet frame to a destination device, e.g., host device 114, if the payload of the inner Ethernet frame includes an IP packet with an IP header specifying a destination IP address corresponding to host device 114.

Second Embodiment

Egress and ingress packet processing performed in a network device for multi-hop WAN MACsec according to the second embodiment is now described.

Figure 17:
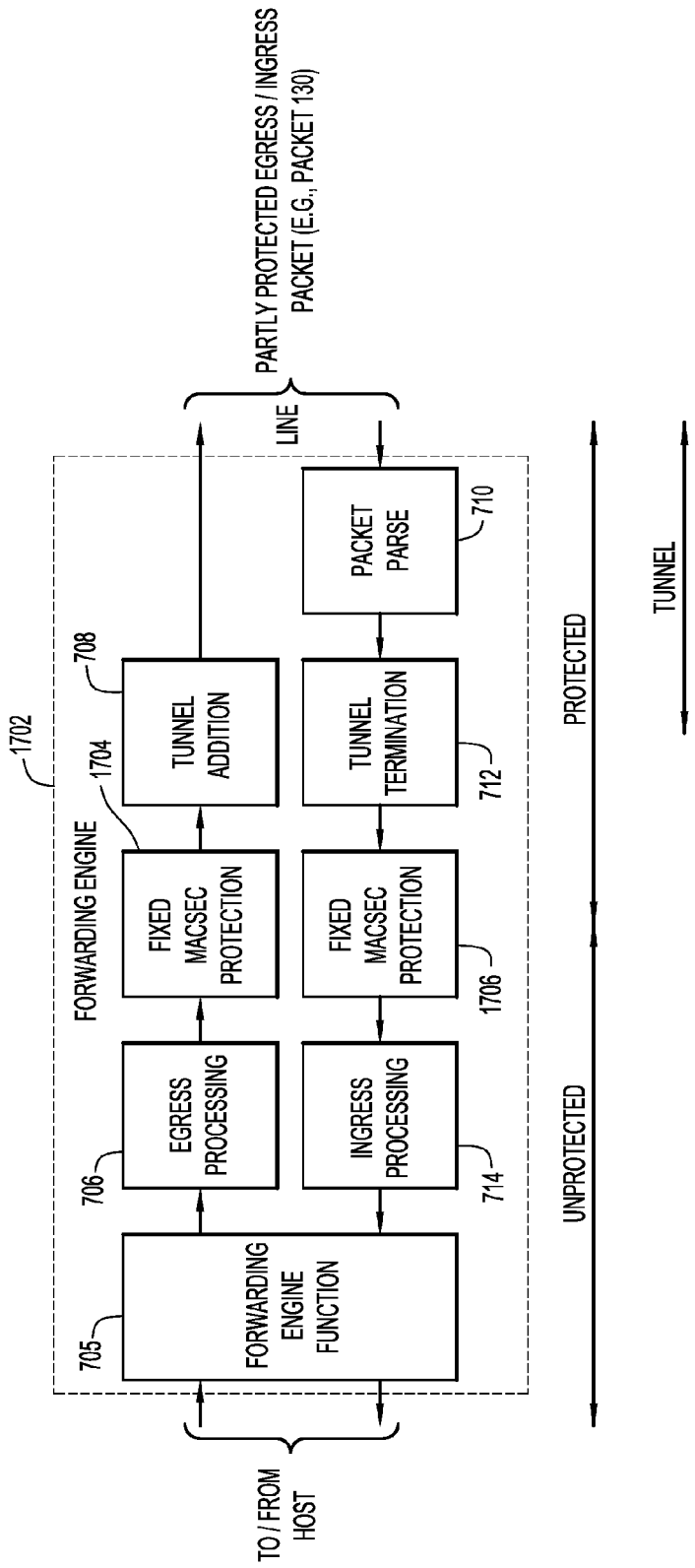
FIG. 17 is a block diagram of an architecture of a network device for processing egress and ingress packets in multi-hop WAN MACsec, according to a second embodiment.

With reference to FIG. 17, there is an example architecture 1700 of a network device (e.g., network device 102 or 110) for processing egress and ingress packets in multi-hop WAN MACsec, according to the second embodiment. Unlike first embodiment architecture 700, second embodiment architecture 1700 does not split egress and ingress processing across a forwarding engine and a PHY as depicted in FIG. 7. Instead, second embodiment architecture 1700 includes an "in-line" forwarding engine 1702 that implements, in-line with forwarding processing functions of the forwarding engine, a fixed MACsec processing function 1704 in the egress direction and a fixed MACsec processing function 1706 in the ingress direction. In second embodiment architecture 1700: in the egress direction, tunnel addition function 708 adds tunnel headers after fixed MACsec processing function 1704 performs MACsec protection; and, in the ingress direction, tunnel termination function 712 terminates the tunnel and removes tunnel headers before fixed MACsec protection function 1706 removes the MACsec protection. This ordering of processing is reverse to that performed in first embodiment architecture 700.

High-level packet encapsulation/egress processing within an IP tunnel that may be performed with/by second embodiment architecture 1700 in accordance with the second embodiment includes the following operations:

a. Forwarding engine function 705 receives an unprotected Ethernet frame (packet) from the host and forwards the received packet to egress processing function 706.
b. Egress processing function 706 identifies a destination tunnel of the received packet.
c. The destination tunnel is associated with a SecY and MACsec protection policy. Fixed MACsec processing function 1704 performs MACsec protection/encapsulation on the received packet. Because no tunnel has been appended prior to MACsec protection, MACsec processing function 1704 does not need variable offset processing as was needed in the first embodiment (hence the name "Fixed MACsec processing function").
d. Tunnel addition function 708 appends tunnel headers to the protected packet, including L3 tunnel encapsulation, an IP header (including priority), and an outer Ethernet frame based in part on the identified tunnel, and transmits the partly protected packet (with its unprotected headers) to the line (to network 106).

High-level packet decapsulation/ingress processing within an IP tunnel that may be performed with/by second embodiment architecture 1700 in accordance with the second embodiment includes the following operations:
a. Forwarding engine 1702 receives a partly protected packet from the line.
b. Packet parse function 710 parses the received packet to identify the tunnel over which the packet was transmitted.
c. Tunnel termination function 712 terminates the tunnel and removes tunnel headers from the received packet.
d. Fixed MACsec processing function 1706 performs MACsec processing, e.g., removes MACsec protection from the received packet. Because the tunnel has been removed, variable offset processing is not needed.
e. Ingress processing function 714 and forwarding engine function 705 perform final stage ingress processing.

As can be seen from the high-level description above, in the second embodiment, MACsec protection is performed in-line with the forwarding engine function and then tunnel addition is performed, while on ingress, tunnel termination is performed before MACsec processing.

Figure 18:
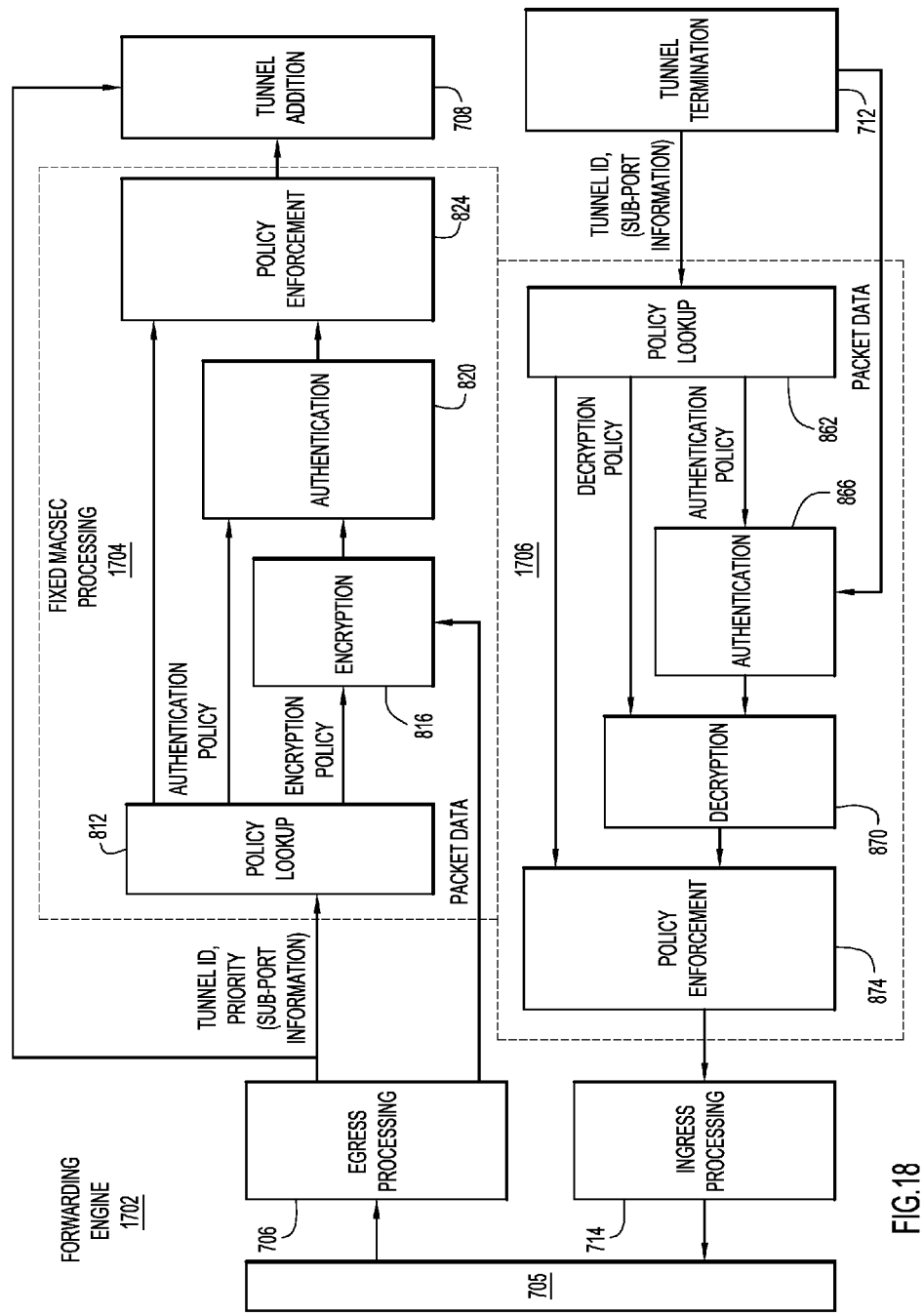
FIG. 18 is a block diagram expanding on fixed MACsec processing functions of the architecture of FIG. 17, according to the second embodiment.

With reference to FIG. 18, there is a block diagram of forwarding engine 1702 that expands on fixed MACsec processing functions 1704 and 1706 depicted in FIG. 17. Fixed MACsec processing function 1704 includes many of the same processing blocks as egress processor 802 shown in FIG. 8, except that packet parser 805 and sub-port lookup 808 are omitted from fixed MACsec processing function 1704 because of the reverse order in which tunnel headers are added and removed in forwarding engine 1702 compared to the first embodiment, and because no tunnel has been added prior to when fixed MACsec processing function 1704 operates there is no need for fixed MACsec processing function 1704 to deal with variable offsets for where to encrypt and authenticate. Similarly, fixed MACsec processing function 1706 includes many of the same processing blocks as ingress processor 804 shown in FIG. 8, except that packet parser 854 and sub-port lookup 858 are omitted from fixed MACsec processing function 1706 because of the reverse order in which tunnel headers are added and removed in forwarding engine 1702 compared to the first embodiment, and because the tunnel has been removed prior to fixed MACsec processing function 1706 operates there is no need for fixed MACsec processing function 1706 to deal with variable offsets for where to remove MACsec protection.

Figure 19:
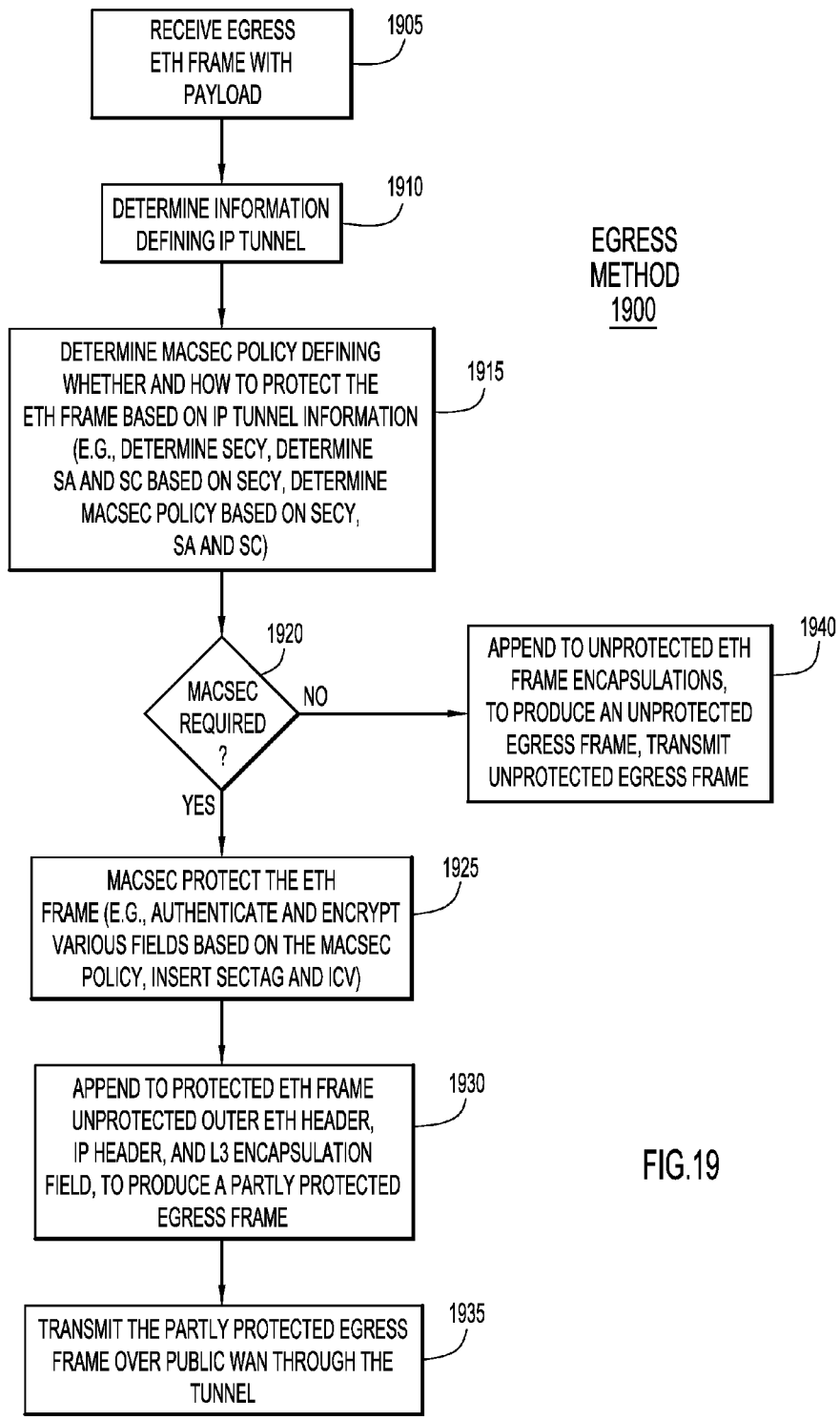
FIG. 19 is a flowchart of a method of performing egress packet/frame processing performed by an egress processor of a network device, according to the second embodiment.

With reference to FIG. 19, there is a flowchart of an example method 1900 of egress packet or frame processing performed in a network device (e.g., by forwarding engine 1702), according to the second embodiment. In the description of method 1900, the term "egress frame" is synonymous and interchangeable with "egress packet." All of the operations of method 1900 may be performed in a single network device (e.g., network device 102 or 110), that is, without transmitting packets between network devices over a line connected with a network. FIG. 19 is described also with reference to processing blocks depicted in FIG. 18.

At 1905, egress processing function 706 receives an unprotected Ethernet frame (an egress frame) from forwarding engine function 705. The Ethernet frame may have originated from a host device (e.g., host 102).

At 1910, egress processing function 706 determines information defining an IP tunnel between the network device hosting forwarding engine 1702 and a peer network device. Such information may include an IP destination address and priority information (e.g., DSCP bits) associated with the IP tunnel, similar to the sub-port information output by sub-port lookup 708 described above for the first embodiment.

At 1915, fixed MACsec processing function 1704 determines a MACsec policy that defines whether and how to protect the Ethernet frame based on the information defining the IP tunnel and information identifying the port on which the Ethernet frame was received. MACsec processing function 1704 determines a SecY, an SA, and an SC based on the information defining the IP tunnel, and determines the MACsec policy based on those associations, as described above, for example.

At 1920, fixed MACsec processing function 1704 determines whether the MACsec policy indicates that the Ethernet frame is to be protected or is not to be protected. If the policy indicates MACsec protection, flow proceeds to 1925. Otherwise flow proceeds to 1940.

At 1925, fixed MACsec processing function 1704 protects the Ethernet frame according to the MACsec policy. To MACsec protect the Ethernet frame, fixed MACsec processing function 1704 may authenticate, encrypt, or both authenticate and encrypt one or more the Ethernet header, the Ethernet type field, and the payload of the Ethernet frame according to the MACsec policy, and also insert a SecTag and an ICV into the inner Ethernet frame.

At 1930, tunnel addition function 708 appends to the protected Ethernet frame (i) an unprotected L3 encapsulation identifying an L2-over-L3 tunnel protocol, (ii) an unprotected IP header corresponding to the IP tunnel, and (iii) an unprotected outer Ethernet header, to produce a partly protected output egress frame, where the protected Ethernet frame becomes a protected inner Ethernet frame.

At 1935, forwarding engine 1702 transmits the partly protected egress frame to the peer network device over the IP tunnel of the public wide area network.

If it is determined at 1920 that the MACsec policy indicates that the Ethernet frame is not to be MACsec protected, at 1940, (i) fixed MACsec processing function 1704 does not MACsec protect the Ethernet frame, (ii) tunnel addition function 708 appends the headers/encapsulation (the same as in operation 1930), and (iii) forwarding engine 1702 transmits the fully unprotected egress frame to the peer network device over the IP tunnel of the public wide area network.

Figure 20:
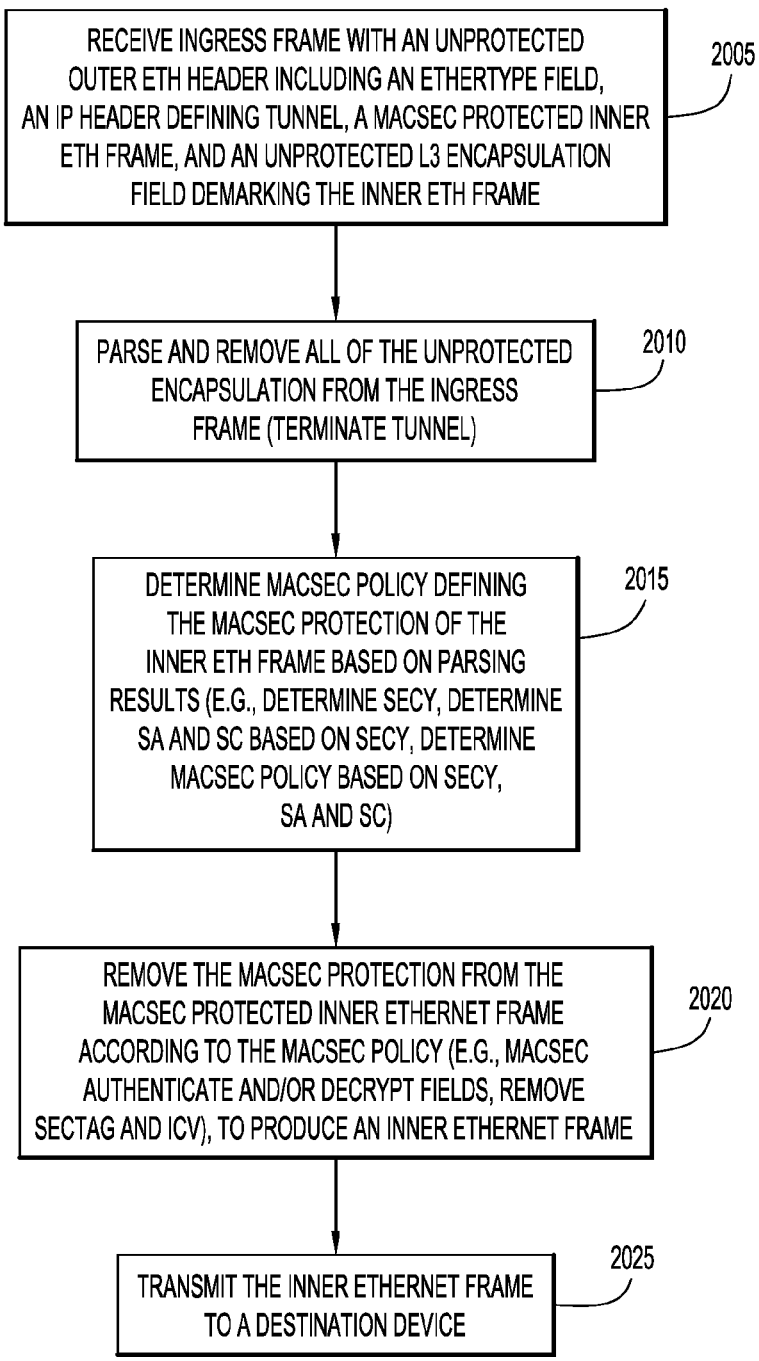
FIG. 20 is a flowchart of a method of performing ingress packet/frame processing performed by an ingress processor of a network device, according to the second embodiment.

With reference to FIG. 20, there is a flowchart of an example method 2000 of ingress packet processing performed by forwarding engine 1702 of a network device, according to the second embodiment. In the description of method 2000, the term "ingress frame" is synonymous and interchangeable with "ingress packet." All of the operations of method 2000 may be performed in a single network device (e.g., network device 102 or 110), that is, without transmitting packets between network devices over a line connected with a network. FIG. 20 is described also with reference to FIG. 18.

At 2005, forwarding engine 1702 of a network device (e.g., network device 102) receives an ingress frame transmitted by a peer network device (e.g., network device 110) to the network device over a public WAN (e.g., network 106) via an IP tunnel (e.g., tunnel 131). The ingress frame includes an unprotected outer Ethernet header, an unprotected IP header defining the IP tunnel, an unprotected L3 encapsulation identifying an L2-over-L3 tunnel protocol, and a MACsec protected inner Ethernet frame carrying a payload destined for a destination device (e.g., host device 114).

At 2010, tunnel termination function 712 parses the unprotected encapsulations, including the outer Ethernet frame, the IP header, and the L3 encapsulation, and removes all of these encapsulations. Results of the parsing include, but are not limited to, an IP destination address and priority information (e.g., DSCP bits) associated with the IP tunnel, similar to the sub-port information output by sub-port lookup block 758 described above for the first embodiment.

At 2015, fixed MACsec processing function 1704 determines a MACsec policy that defines the MACsec protection on the MACsec protected inner Ethernet frame based on results of the parsing and information identifying the port on which the egress frame was received. MACsec processing function 1704 determines a SecY, an SA, and an SC based on the parsing results, and determines the MACsec policy based on those associations, as described above, for example.

At 2020, fixed MACsec processing function 1704 removes the MACsec protection from the MACsec protected inner Ethernet frame according to the MACsec policy, to produce an inner Ethernet frame, similar to operation 1620 described above in connection with ingress processing in the first embodiment.

At 2025, fixed MACsec processing function 1704 transmits the inner Ethernet frame to ingress processing function 714. Forwarding engine 1702 ultimately forwards the inner Ethernet frame to a host device for which the Ethernet frame is destined.

First and Second Embodiment Comparison, and Third ("Two-Box") Embodiment

As can be seen from a comparison of the first and second embodiments, a difference between them is the order of operations of when MACsec processing is performed in relation to when tunnel generation (adding tunnel headers) and tunnel termination (removing tunnel headers) are performed. The packet format for packets 130 transmitted to and received from the line (to and from network 106) are identical and the network devices which process the packets can not identify whether processing of the first embodiment or processing of the second embodiment was used to generate the packets. In both embodiments, appropriate priority and tunnel information is added to the packet based on information obtained before the MACsec encryption. Because of this, in both embodiments, multiple connections and multiple priorities can be represented on a single network device port. Because of the operation reordering of the second embodiment, for egress processing, the forwarding engine passes tunnel identification information (e.g., the equivalent of sub-port information) to the fixed MACsec processing and, therefore, the policy look up no longer needs to identify variable offsets for encryption and authentication. Also, for ingress processing, the ingress and sub-port information is passed to the fixed MACsec processing block by the tunnel termination function and the packet data, with the tunnel encapsulation having been removed, is passed to the authentication and decryption blocks.

Figure 21:
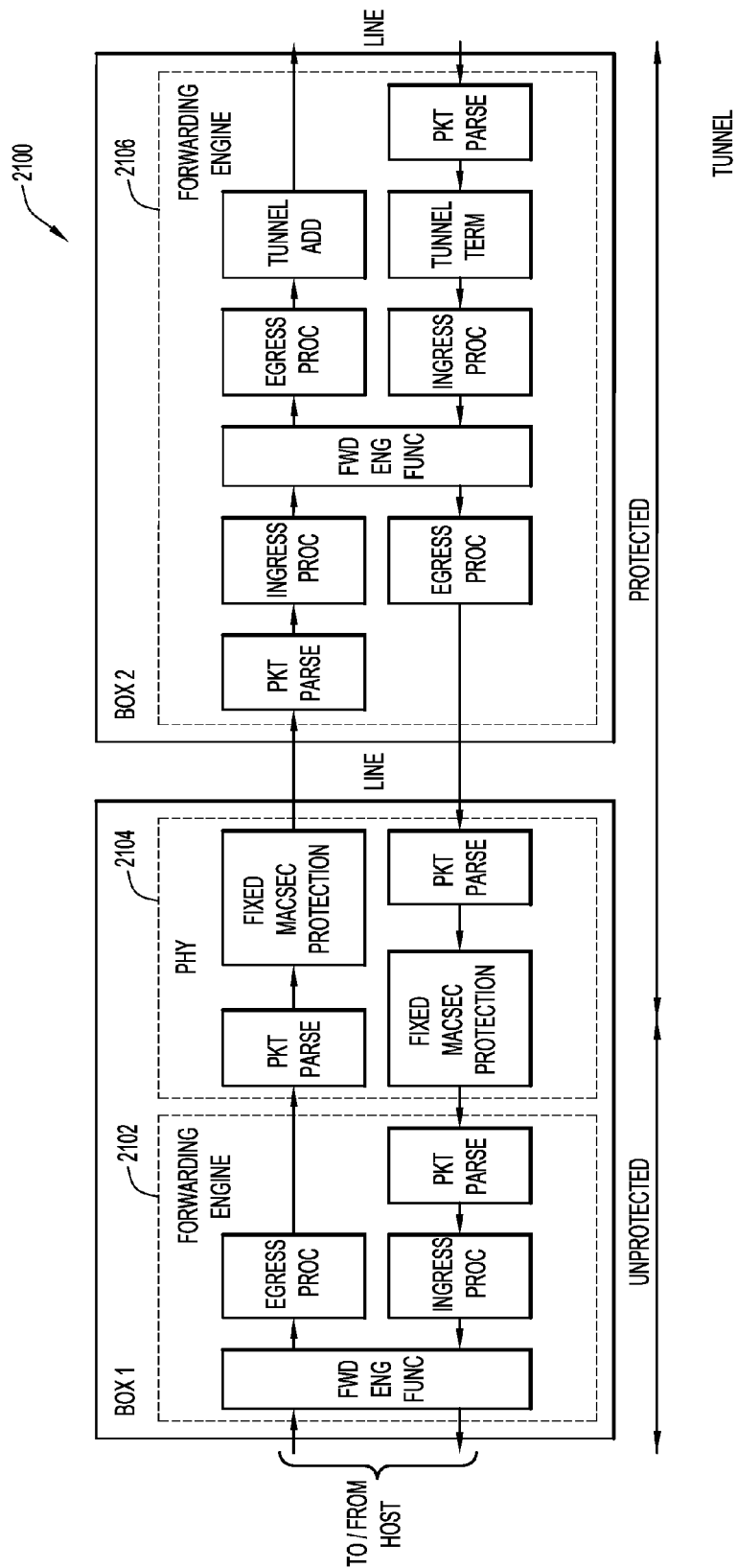
FIG. 21 is a two network device architecture referred to as a "two box" architecture for performing ingress and egress packet/frame processing, according to a third embodiment.

Both the first and second embodiments may be implemented in a single network device as a "one box" solution, as depicted in FIGS. 17 and 18, respectively. In contrast, a third embodiment or "two box" architecture 2100 is shown in FIG. 21. Two box architecture 2100 includes a first box, Box 1, and a second box, Box 2, physically separated from Box 1 by the line over which Box 1 and Box 2 exchange packets with each other. Box 1 includes both a forwarding engine 2102 and a PHY 2104, while Box 2 includes only a forwarding engine 2106. Box 1 launches an encrypted packet towards Box 2. Box 2 appends appropriate tunnel information in headers to the encrypted packet as it progresses from left-to-right in FIG. 21.

Box 2 does not have visibility into the payload of the packet from Box 1 because that payload was encrypted by Box 1. Without such visibility, Box 2 can not append appropriate priority information to the packet, nor can Box 2 identify a final destination of the packet. Because of this, each network port on the left-side of Box 2 has a 1:1 relationship with a corresponding network port on the right-side of Box 2.

A difference between the one box embodiments (i.e., the first and second embodiments described herein) and the two-box architecture (in which Box 1 performs MACsec processing and then Box 2 performs the tunneling operation) is that in the one box embodiments the tunneling operation can choose policy base on a final destination of the packet (such as an appropriate priority information, etc.), which has not been encrypted.

Generalized Network Device

Figure 22:
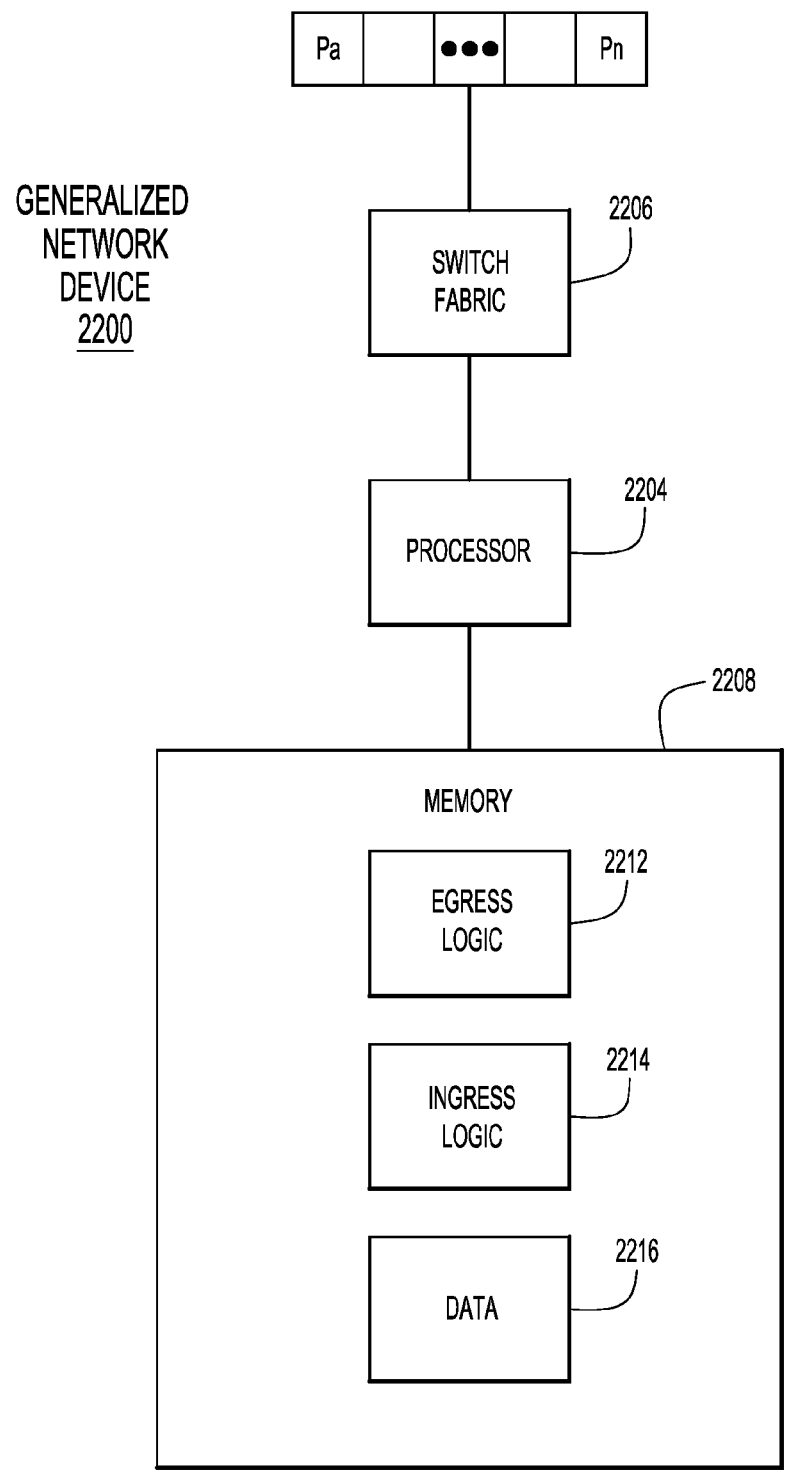
FIG. 22 a block diagram of a network device configured to perform egress and ingress operations, according to an embodiment.

With reference to FIG. 22, there is shown a generalized block diagram of a network device, such as network device 102 or 110, configured to perform egress and ingress operations as described herein, according to an embodiment. There are numerous possible configurations for network device 2200 and FIG. 22 is meant to be an example. Network device 2200 includes physical network ports Pa-Pn to allow network device 2200 to communicate over a network, a processor 2204, a switch fabric 2206 coupled to the network ports and the processor, and memory 2208. The network interface (I/F) unit 2202 includes Ethernet card devices for example configured with e.g., a wired network. Network ports Pa-Pn may connect with host networks 104 and 112 and with public network 106, for example, and switching between the ports is effected by switch fabric 2206. Processor 2204 is a microcontroller or microprocessor, for example, configured to execute software instructions stored in the memory 2208.

The memory 2208 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 2208 may comprise one or more computer readable storage media (e.g., a memory device) encoded with software comprising computer executable instructions and when the software is executed (by processor 2204) it is operable to perform the operations described herein. For example, memory 2208 stores or is encoded with egress logic 2212 to perform egress processing on egress packets and ingress logic 2214 to perform ingress processing of ingress packets in according with the first and second embodiments described herein. In addition, the memory 2208 stores data 2216 used and generated by logic 2212 and 2214. In an alternative arrangement, logic to implement egress and ingress processing may be distributed across switch network ports Pa-Pn, fabric 2206 and memory 2208, or alternatively, may reside wholly in the ports and/or switch fabric 2206. For example, in various example implementations, egress and ingress processing functions may be connected to, or may comprise part of, one or more of network ports Pa-Pn, switch fabric 2206, memory 2208, and processor 2204.

Summary

Advantages and benefits of MACsec over L3 are: simplified WAN topologies; ubiquitous encryption of data between network nodes; line rate encryption (1G/10G/40G/100G) per interface—high throughput, and better performance; less overhead per packet (~52 bytes for IPsec vs ~40 bytes for MACsec, and an even further reduction if the Secure Channel Identifier (SCI) is not needed; L3 services are allowed to run seamlessly as if the nodes are directly connected; LAN extension is allowed thereby supporting mobility and data center interconnect applications; L3 is encrypted (no need for another overlay network); L2 is integrity protected; and IPsec tunnel-less encryption frees network device resource from IPsec encryption thus allowing more services enablement.

First Embodiment

In summary, in one form, an egress frame processing method performed in a network device is provided comprising: receiving an egress frame including an outer Ethernet frame, an Internet Protocol (IP) header defining an IP tunnel between the network device and a peer network device over a public wide area network, a layer 3 (L3) encapsulation identifying a layer 2 (L2)-over-L3 tunnel protocol, and an inner Ethernet frame with a payload and that is demarcated by the L3 encapsulation; and parsing the outer Ethernet frame, the IP header, the L3 encapsulation, and the inner Ethernet frame; determining a media access control security (MACsec) policy that defines how to protect the inner Ethernet frame based on results of the parsing; protecting the inner Ethernet frame according to the MACsec policy, while leaving unprotected the outer Ethernet frame, the IP header, and the L3 encapsulation, to produce a partly protected output egress frame; and transmitting the partly protected output egress frame to the peer network device over the IP tunnel of the public wide area network.

In another form, an apparatus is provided, comprising: network ports; a switch fabric connected with the network ports; and an egress processor connected to, or comprising part of one or more of, the network ports and the switch fabric, the egress processor configured to: receive, via one of the network ports, an egress frame including an outer Ethernet frame, an Internet Protocol (IP) header defining an IP tunnel between the network device and a peer network device over a public wide area network, a layer 3 (L3) encapsulation identifying a layer 2 (L2)-over-L3 tunnel protocol, and an inner Ethernet frame with a payload and that is demarcated by the L3 encapsulation; parse the outer Ethernet frame, the IP header, the L3 encapsulation, and the inner Ethernet frame; determine a media access control security (MACsec) policy that defines how to protect the inner Ethernet frame based on results of the parsing; protect the inner Ethernet frame according to the MACsec policy, while leaving unprotected the outer Ethernet frame, the IP header, and the L3 encapsulation, to produce a partly protected output egress frame; and transmit the partly protected output egress frame to the peer network device over the IP tunnel of the public wide area network.

In another form, an ingress frame processing method performed in a network device is provided comprising: receiving an ingress frame transmitted by a peer network device to the network device over a public wide area network via an Internet Protocol (IP) tunnel, the ingress frame including an unprotected outer Ethernet frame, an unprotected IP header defining the IP tunnel, an unprotected layer 3 (L3) encapsulation identifying a layer 2 (L2)-over-L3 tunnel protocol, and a MACsec protected inner Ethernet frame carrying a payload destined for a destination device; parsing the unprotected outer Ethernet frame, the unprotected IP header, the unprotected L3 encapsulation, and the MACsec protected inner Ethernet frame: determining a media access control security (MACsec) policy that defines the MACsec protection on the MACsec protected inner Ethernet frame based on results of the parsing; removing the MACsec protection from the MACsec protected inner Ethernet frame according to the MACsec policy, to produce an inner Ethernet frame; and transmitting the inner Ethernet frame to the destination device.

In yet another form, a non-transitory processor readable medium storing instructions is provided. The instructions, when executed by a processor, perform the above described methods.

Second Embodiment

In one form, an egress frame processing method performed at a network device is provided, comprising: receiving an egress frame including an Ethernet frame with a payload; determining information defining an Internet Protocol (IP) tunnel between the network device and a peer network device over a public wide area network; determining a media access control security (MACsec) policy that defines how to protect the Ethernet frame based on the information defining the IP tunnel; protecting the Ethernet frame according to the MACsec policy; appending to the protected Ethernet frame (i) an unprotected layer 3 (L3) encapsulation identifying a layer 2 (L2)-over-L3 tunnel protocol, (ii) an unprotected IP header corresponding to the IP tunnel, and (iii) an unprotected outer Ethernet header, to produce a partly protected egress frame; and transmitting the partly protected egress frame to the peer network device over the IP tunnel of the public wide area network.

In another form, an apparatus is provided, comprising: network ports; a switch fabric connected with the network ports; and a processor connected to, or comprising part of, the switch fabric, and configured to: receiving an egress frame including an Ethernet frame with a payload; determining information defining an Internet Protocol (IP) tunnel between the network device and a peer network device over a public wide area network; determining a media access control security (MACsec) policy that defines how to protect the Ethernet frame based on the information defining the IP tunnel; protecting the Ethernet frame according to the MACsec policy; appending to the protected Ethernet frame (i) an unprotected layer 3 (L3) encapsulation identifying a layer 2 (L2)-over-L3 tunnel protocol, (ii) an unprotected IP header corresponding to the IP tunnel, and (iii) an unprotected outer Ethernet header, to produce a partly protected egress frame; and transmitting the partly protected egress frame to the peer network device over the IP tunnel of the public wide area network.

In yet another form, an ingress frame processing method performed at a network device is provided, comprising: receiving an ingress frame transmitted by a peer network device to the network device over a public wide area network via an Internet Protocol (IP) tunnel, the ingress frame including an unprotected outer Ethernet frame, an unprotected IP header defining the IP tunnel, an unprotected layer 3 (L3) encapsulation identifying a layer 2 (L2)-over-L3 tunnel protocol, and a MACsec protected inner Ethernet frame carrying a payload destined for a destination device; parsing the outer Ethernet frame, the IP header, and the L3 encapsulation; removing the outer Ethernet frame, the IP header, and the L3 encapsulation from the ingress frame; determining a media access control security (MACsec) policy that defines the MACsec protection on the MACsec protected inner Ethernet frame based on results of the parsing; removing the MACsec protection from the MACsec protected inner Ethernet frame according to the MACsec policy, to produce an inner Ethernet frame; and transmitting the inner Ethernet frame to the destination device.

In yet another form, a non-transitory processor readable medium storing instructions is provided. The instructions, when executed by a processor, perform the above described methods.

The above description is intended by way of example only.

What is claimed is:

1. An egress frame processing method performed at a network device, comprising:
    receiving an egress frame including an outer Ethernet frame, an Internet Protocol (IP) header defining an IP tunnel between the network device and a peer network device over a public wide area network, a layer 3 (L3) encapsulation identifying a layer 2 (L2)-over-L3 tunnel protocol, and an inner Ethernet frame with a payload and that is demarcated by the L3 encapsulation; and
    parsing the outer Ethernet frame, the IP header, the L3 encapsulation, and the inner Ethernet frame;
    determining a media access control security (MACsec) policy that defines how to protect the inner Ethernet frame based on results of the parsing;
    protecting the inner Ethernet frame according to the MACsec policy, while leaving unprotected the outer Ethernet frame, the IP header, and the L3 encapsulation, to produce a partly protected output egress frame; and
    transmitting the partly protected output egress frame to the peer network device over the IP tunnel of the public wide area network.

2. The method of claim 1, wherein the parsing includes parsing the IP header based on an Ethertype field of the outer Ethernet frame to extract a destination IP address of the IP tunnel, and the method further comprises:
    determining a MACsec entity based on the destination IP address of the IP tunnel; and
    determining a security association and a MACsec secure channel based on at least the MACsec entity,
    wherein the determining the MACsec policy includes determining the MACsec policy based on the MACsec entity, the security association, and the secure channel.

3. The method of claim 2, wherein:
    the determining the MACsec entity further includes determining the MACsec entity additionally based on a physical port of the network device at which the egress frame was received, priority bits also extracted from the IP header, and a sub-port associated with the Ethernet packet that is mapped to the MACsec entity; and
    the determining the security association and the secure channel includes determining the security association and the secure channel based on the sub-port.

4. The method of claim 1, wherein:
    the MACsec policy identifies which ones of an Ethernet header, an Ethernet type field, and the payload of the inner Ethernet frame each available from the parsing results, are to be MACsec protected; and
    the protecting includes:
        protecting the identified ones of the Ethernet header, the Ethernet type field, and the payload of the inner Ethernet frame; and
        inserting a MACsec security tag and an integrity check value into the inner Ethernet frame.

5. The method of claim 4, wherein the protecting further includes authenticating, encrypting, or both authenticating and encrypting one or more of the identified ones of the Ethernet header, the Ethernet type field, and the payload of the inner Ethernet frame.

6. The method of claim 1, wherein the MACsec policy further indicates whether the inner Ethernet frame is to be protected or is not to be protected, the method further comprising:
    determining whether the MACsec policy indicates that the inner Ethernet frame is to be protected or is not to be protected;
    if it is determined that the MACsec policy indicates that the inner Ethernet frame is to be protected, performing the protecting and the transmitting the partly protected output egress frame; and
    if it is determined that the MACsec policy indicates that the inner Ethernet frame is not to be protected, not performing the protecting.

7. The method of claim 1, wherein:
    the payload of the inner Ethernet frame of the egress frame includes an IP packet having a source IP address and a destination IP address corresponding to a source device from which the IP packet originated and a destination device, respectively; and
    the MACsec protecting the inner Ethernet frame includes MACsec protecting the IP packet therein.

8. The method of claim 1, wherein the egress frame processing method is performed at a single network device.

9. An apparatus, comprising:
    one or more network ports;
    a switch fabric connected with the one or more network ports; and
    a processor connected to, or comprising part of, the switch fabric, and configured to:
        receive, via one of the network ports, an egress frame including an outer Ethernet frame, an Internet Protocol (IP) header defining an IP tunnel between the network device and a peer network device over a public wide area network, a layer 3 (L3) encapsulation identifying a layer 2 (L2)-over-L3 tunnel protocol, and an inner Ethernet frame with a payload and that is demarcated by the L3 encapsulation;
        parse the outer Ethernet frame, the IP header, the L3 encapsulation, and the inner Ethernet frame;

determine a media access control security (MACsec) policy that defines how to protect the inner Ethernet frame based on results of the parsing;

protect the inner Ethernet frame according to the MACsec policy, while leaving unprotected the outer Ethernet frame, the IP header, and the L3 encapsulation, to produce a partly protected output egress frame; and transmit the partly protected output egress frame to the peer network device over the IP tunnel of the public wide area network.

10. The apparatus of claim 9, wherein the processor is configured to parse by parsing the IP header based on an Ethertype field of the outer Ethernet frame to extract a destination IP address of the IP tunnel, and the processor is further configured to:

determine a MACsec entity based on the destination IP address of the IP tunnel; and determine a security association and a MACsec secure channel based on at least the MACsec entity, wherein the processor is configured to determine the MACsec policy based on the MACsec entity, the security association, and the secure channel.

11. The apparatus of claim 10, wherein:

the processor is configured to determine the MACsec entity by determining the MACsec entity additionally based on a physical port of the network device at which the egress frame was received, priority bits also extracted from the IP header, and a sub-port associated with the Ethernet packet that is mapped to the MACsec entity; and the processor is configured to determine the security association and the secure channel by determining the security association and the secure channel based on the sub-port.

12. The apparatus of claim 9, wherein:

the MACsec policy identifies which ones of an Ethernet header, an Ethernet type field, and the payload of the inner Ethernet frame each available from the parsing results, are to be MACsec protected; and the processor is configured to protect by:

protecting the identified ones of the Ethernet header, the Ethernet type field, and the payload of the inner Ethernet frame; and inserting a MACsec security tag and an integrity check value into the inner Ethernet frame.

13. The apparatus of claim 12, wherein the processor is further configured to protect by authenticating, encrypting, or both authenticating and encrypting one or more of the identified ones of the Ethernet header, the Ethernet type field, and the payload of the inner Ethernet frame.

14. The apparatus of claim 9, wherein the MACsec policy further indicates whether the inner Ethernet frame is to be protected or is not to be protected, and the processor is further configured to:

determine whether the MACsec policy indicates that the inner Ethernet frame is to be protected or is not to be protected;

if it is determined that the MACsec policy indicates that the inner Ethernet frame is to be protected, perform the protecting and the transmitting the partly protected output egress frame; and if it is determined that the MACsec policy indicates that the inner Ethernet frame is not to be protected, not performing the protecting.

15. An ingress frame processing method performed at a network device, comprising:

receiving an ingress frame transmitted by a peer network device to the network device over a public wide area network via an Internet Protocol (IP) tunnel, the ingress frame including an unprotected outer Ethernet frame, an unprotected IP header defining the IP tunnel, an unprotected layer 3 (L3) encapsulation identifying a layer 2 (L2)-over-L3 tunnel protocol, and a MACsec protected inner Ethernet frame carrying a payload destined for a destination device;

parsing the unprotected outer Ethernet frame, the unprotected IP header, the unprotected L3 encapsulation, and the MACsec protected inner Ethernet frame:

determining a media access control security (MACsec) policy that defines the MACsec protection on the MACsec protected inner Ethernet frame based on results of the parsing;

removing the MACsec protection from the MACsec protected inner Ethernet frame according to the MACsec policy, to produce an inner Ethernet frame; and transmitting the inner Ethernet frame to the destination device.

16. The method of claim 15, wherein the parsing includes parsing the IP header based on an Ethertype field in the outer Ethernet frame to extract one or more IP addresses of the IP tunnel, the method further comprising:

determining a MACsec entity based on the IP addresses; and determining a security association and a MACsec secure channel based on at least the MACsec entity, wherein the determining the MACsec policy includes determining the MACsec policy based on the MACsec entity, the security association, and the secure channel.

17. The method of claim 16, wherein:

the determining the MACsec entity includes determining the MACsec entity based on a destination IP address of the IP addresses, a physical port of the network device at which the ingress frame was received, and priority bits also extracted from the IP header, a sub-port associated with the ingress frame that is mapped to the MACsec entity; and the determining the security association and the secure channel includes determining the security association and the secure channel based on the sub-port.

18. The method of claim 15, wherein:

the MACsec policy defines the MACsec protection on an Ethernet header, an Ethernet type field, and the payload of the inner Ethernet frame; and the removing the MACsec protection includes removing the MACsec protection from the Ethernet header, the Ethernet type field, and the payload of the inner Ethernet frame according to the MACsec policy, to produce the inner Ethernet frame.

19. The method of claim 18, wherein the removing MACsec protection further includes authenticating, decrypting, or both authenticating and decrypting one or more of the Ethernet header, the Ethernet type field, and the payload of the MACsec protected inner Ethernet frame according to the MACsec policy.

20. The method of claim 15, wherein:

the payload of the inner Ethernet frame includes an IP packet having a source IP address and a destination IP address corresponding to a source device and the destination device, respectively; and the removing the MACsec protection includes removing MACsec protection from the IP packet.

21. The method of claim 15, wherein:
the removing the MACsec protection further includes removing a MACsec security tag and an integrity check value from the MACsec protected inner Ethernet frame, to produce the inner Ethernet frame.

22. The method of claim 15, wherein:
the removing the MACsec protection further includes not removing a MACsec security tag and not removing an integrity check value from the MACsec protected inner Ethernet frame, to produce the inner Ethernet frame.

23. The method of claim 15, wherein the ingress frame processing method is performed at a single network device.

* * * * *